United States Patent [19]
Holm et al.

[11] Patent Number: 4,969,533
[45] Date of Patent: Nov. 13, 1990

[54] WORK VEHICLE

[75] Inventors: David R. Holm, Oconomowoc; Stephen G. Ritter, Juneau; Kenneth E. Hunt, Oconomowoc; Robert N. Behrens, Beaver Dam; Ronald J. Baker, Horicon; Mark F. Hopp, Fox Lake; Denis J. Del Ponte, Beaver Dam, all of Wis.; Paul A. Meyer, Cedar Falls, Iowa

[73] Assignee: Deere & Company, Moline, Ill.

[21] Appl. No.: 226,249

[22] Filed: Jul. 29, 1988

[51] Int. Cl.$^5$ .................. B60K 28/04; B62D 1/18; B62D 3/00; B62D 25/10
[52] U.S. Cl. .................. 180/273; 74/496; 180/68.4; 180/69.2; 180/337; 180/53.1; 280/96; 280/771
[58] Field of Search .......... 180/273, 271, 68.4, 180/68.6, 69.2, 53.1, 337, 345; 280/757, 759, 758, 781; 74/481, 491, 493, 496; 60/464; 56/16.7, 260, 10.1

[56] References Cited

U.S. PATENT DOCUMENTS

| | | |
|---|---|---|
| 2,417,072 | 3/1947 | Graham .................. 74/496 |
| 2,417,073 | 3/1947 | Booth .................. 74/496 |
| 3,360,933 | 1/1968 | Swanson et al. .................. 60/464 |
| 3,376,703 | 4/1968 | Breznski .................. 60/53 |
| 3,431,792 | 3/1969 | Smith .................. 74/481 |
| 3,628,396 | 12/1971 | Grobowski .................. 74/493 |
| 3,700,257 | 10/1972 | Hurlburt .................. 280/96 |
| 3,985,039 | 10/1976 | Federspiel .................. 74/481 |
| 4,051,915 | 10/1977 | Behrens .................. 180/53.1 |
| 4,304,141 | 12/1981 | Tone et al. .................. 180/53.1 |
| 4,317,500 | 3/1982 | Bening .................. 180/273 |
| 4,385,863 | 5/1985 | Minor et al. .................. 180/273 |
| 4,466,504 | 8/1984 | Giandenoto et al. .................. 180/273 |
| 4,509,614 | 4/1985 | Bando et al. .................. 180/273 |
| 4,579,183 | 4/1986 | Irikura et al. .................. 74/15.6 |
| 4,580,811 | 4/1986 | Wykhuis et al. .................. 160/273 |
| 4,607,199 | 8/1986 | Krueger et al. .................. 180/273 |
| 4,640,378 | 2/1987 | Dobberpuhl et al. .................. 180/53.7 |
| 4,651,018 | 3/1987 | Peterson .................. 307/9 |
| 4,655,313 | 4/1987 | Hicks .................. 180/273 |

OTHER PUBLICATIONS

John Deere Service Manual, SM-3040, Dated Nov. 1969, Pertaining to Model 110 and 112 Garden Tractors (List continued on next page.)

*Primary Examiner*—Richard A. Bertsch

[57] ABSTRACT

A tractor includes: (a) a one piece frame having opposite ends defined by respective members adapted for receiving ballast with the rear member including a hitch located below any mounted ballast, (b) a dual screen filtering arrangement located upstream of a radiator and an engine combustion air inlet, (c) an implement lift system including a main spring lift assist which is locked out when the implement is lowered and an auxiliary lift assist for increasing the lift assist for front-mounted implements but is mounted so as to join the main lifts assist to produce a near constant lift force during lifting the implement while producing a minimal lift force when the implement is completely lowered (d) short and long effective lengths of a steering pitman arm may be selected, for respectively minimizing steering effort or maximizing responsiveness, by respectively connecting a mounting point closest to or a mounting point farthest from a pivot axis of the arm to a drag link, (e) a steering wheel is tiltable together with a steering column about a u-joint of the latter to a selected position by operation of a cam-operated latch, (f) a hydrostatic transmission is accurately neutralized by speed and direction and brake controls including adjustable arms, rollers and cams, (g) a tractor hydrostatic transmission includes a manually-operable bypass valve which is shiftable to dump the pressure side of the pump for permitting the tractor to be pushed when the engine is not working, the valve being automatically moved to a normal position permitting normal operation of the pump in response to the pump being driven by the engine, and (h) a switch is mounted to a seat structure so as to open, in response to an operator leaving the tractor seat, the mounting of the switch to the seat being such that a load as small as 20 kg applied at any place on the seat will keep the switch closed.

34 Claims, 19 Drawing Sheets

OTHER PUBLICATIONS and Being in the French Language—Page 15-1 Only.
John Deere Operator's Manual, OM-M47885, Issue L3, Dated 1983, Pertaining to Model 31 Integral Rotary Tiller for Model 110 and 112 Lawn & Garden Tractors—Cover Page Plus pp. 17, 18 and 20.
John Deere Operator's Manual, OM-M89616, Dated 1985, Issue F5, Pertaining to the Model 37A Snow Thrower for Model 110 and 12 and Other Lawn and Garden Tractors—Cover Page Plus pp. 5, 9 and 13.
Gilson Brother's Company Advertising Brochure Pertaining to Compact Tractors, Dated 9/1977, Selected Portions Only.

Kubota Tractor Company, Advertising Brochure Pertaining to Kubota Diesel Lawn & Garden Tractors, Dated Jul. 1985, Selected Portions Only.

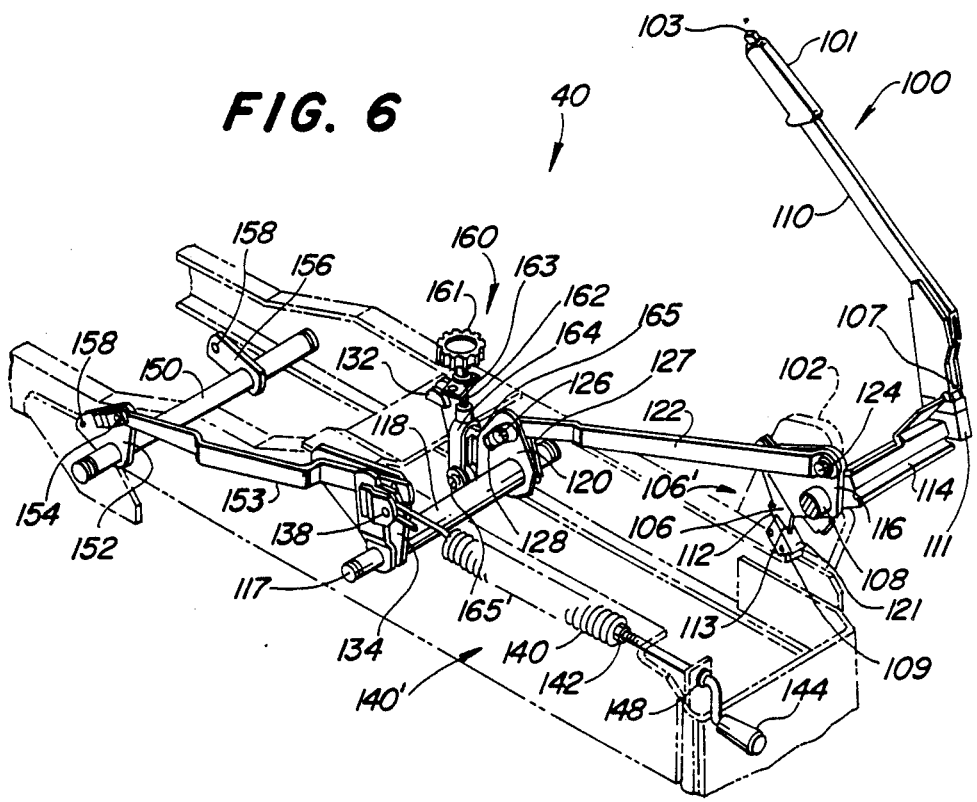
FIG. 6
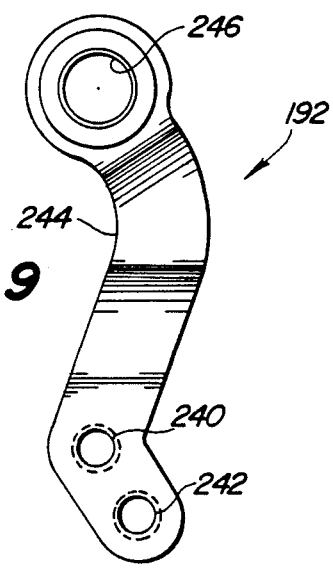
FIG. 9
FIG. 9a

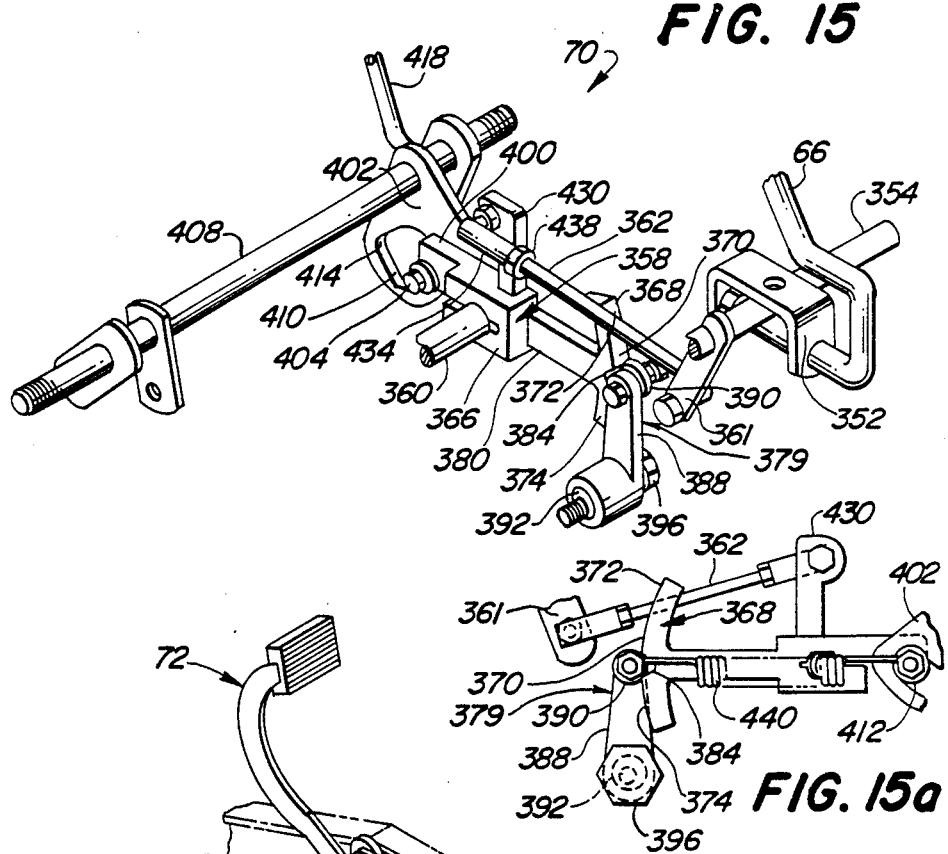
FIG. 15
FIG. 15a
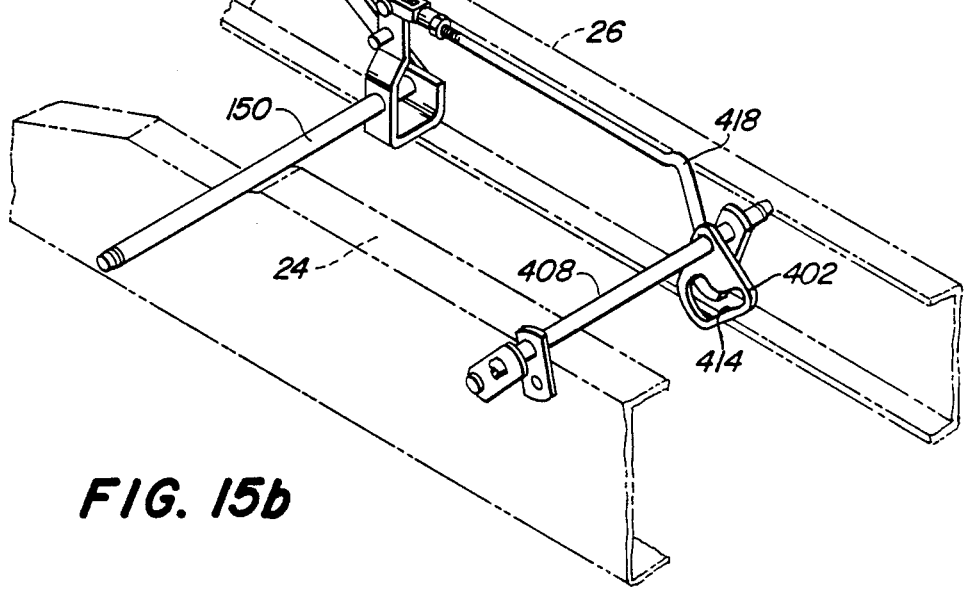
FIG. 15b

WORK VEHICLE

BACKGROUND OF THE INVENTION

The present invention relates to an improved work vehicle and more specifically relates to a work vehicle having various improved systems which enhance the performance characteristics of the vehicle and being constructed through improved manufacturing and assembly techniques.

The vehicle disclosed is a lawn and garden tractor which is an example of the smaller range of tractors with which the present invention is particularly adapted for use, such tractors typically including a main frame supported on a rear pair of drive wheels and a front pair of steerable ground wheels, an engine acting through a transmission system for powering the drive wheels and including a power take-off adapted for being connected for driving any powered implements that might be attached to the vehicle, a steering system connected to the steerable front wheels, an operator's station including a seat and a transmission control system for controlling the ground speed of the vehicle.

It is also well known to enclose the tractor engine with a hood and associated baffles or panels in such a way that relatively clean combustion air enters the engine carburetor. Typically, when the engine is water-cooled, the air that flows through the radiator for removing heat therefrom comes from a zone that is different than that from which the combustion air comes. This has the disadvantage of requiring two different screening or filtering assemblies to be provided in order to ensure that the air flowing into the carburetor or through the radiator is relatively free of debris that will adversely affect carburetion or will clog the air passages of the radiator so as to adversely affect cooling of the engine.

Typically, the main frame of such tractors is fabricated from a relatively large number of pieces which are arc welded together. Because the arc welding process involves a substantial input of heat into the metal being welded, relatively heavy material is required in order to minimize material distortion and to make up for strength loss caused by the heat input. Further, the arc welding process has been done mainly by hand resulting in inconsistent welds leading to quality problems.

Heretofore, the most common method of ballasting a tractor properly to accommodate for various front-, mid- or rear-mounted implements has been to mount suitcase weights to the front of the tractor main frame when forward located ballast is desired and to mount wheel weights to the rear wheels when rearward located ballast is desired. Typically, the mounting of the suitcase weights to the main frame has required the mounting of a separate U-shaped bracket to the front of the main frame while wheel weights are somewhat specially made and are cumbersome to mount.

Typically, a tractor is provided with a lift system that is adapted for connection to an implement mounted to the tractor frame for the purpose of raising and lowering the implement between working and transport positions. It is well known to embody helper springs in such lift systems in order to keep the lift effort at a reasonable amount. These helper springs are often adjustable to accommodate for different types of implements having different weights or mounting structure geometries, but some are not easily adjustable and others are not arranged so as to effect a near constant lifting force throughout the range of movement of the particular implement being raised and lowered, as is desirable when the implement is relatively heavy, a rear mounted tiller or a front mounted snowblower being examples of such implements.

The typical tractor steering system includes a gear box having an input shaft coupled for being driven by the tractor steering wheel and an output shaft which is coupled to the steering linkage by a pitman arm. The effective length of the pitman arm determines how much effort must be used in turning the steering wheel in a given situation and determines steering responsiveness, i.e., how many turns lock-to-lock of the steering wheel are required to move the wheels between maximum right-hand and left-hand turning position. Usually, the effective length of the pitman arm is a fixed length chosen as a compromise between that length which would be most desirable for operations where the steerable front wheels are heavily loaded and considerable turning resistance must be overcome, as when a snowblower is mounted to the tractor, for example, and that length which would be most desirable for operations where the tractor must be quickly turned, as when a mower is mounted to the tractor, for example.

The steering systems of many tractors have a fixed steering wheel which may not be properly located for some operators to easily mount or dismount the tractor or for comfortable manipulation by operators of different size. While some tractors have tilt mechanisms for overcoming the above-noted deficiencies, these mechanisms are relatively complex.

Tractors of the type described hereinabove are often equipped with a variable speed hydrostatic transmission including a pump embodying a swash plate that is pivotable, by a speed and direction control lever, to opposite sides of a centered, neutral, zero-displacement position to respective forward and reverse drive positions. It is known to interlock traction drive brake controls with the direction and speed controls of the hydrostatic transmission so that upon the brakes being applied, the control lever is moved to a centered neutral position corresponding to that of the swash plate. However, the structure for interlocking the brake and transmission controls have suffered from one or more of the drawbacks of being too complex or of requiring frequent adjustment in order to ensure that the swash plate is in neutral when the control lever is in neutral.

When a tractor equipped with a hydrostatic transmission of the aforedescribed type is moved without the engine running, the drive wheels act through the drive train coupling them to the output shaft of the motor to drive the motor as a pump. Under these conditions, the fluid in the supply-return lines coupling the pump and motor units together is blocked from flowing freely between the units thus making it very difficult to move the tractor. To overcome this difficulty, it is known to provide a free wheel or bypass valve which is manually actuatable to interconnect the supply-return lines together to thus provide a fluid path which permits the free circulation of fluid between the lines whereby the tractor may be easily moved about. Because it would be harmful to the transmission and/or might provide a safety concern if the tractor engine were started to drive the pump with the bypass valve open, it is known to use a valve which is constantly biased toward its closed position, thus requiring manual effort to be applied during anytime it is desired to move the tractor with the engine not running. Since it is sometimes necessary for the person holding the valve open to simultaneously push and steer the tractor, the task of holding the valve open is sometimes difficult to do.

Lawn and garden tractors of the above-described type are often provided with safety interlock systems embodying an operator presence sensing switch which have the objective of preventing certain operating procedures from being done unless the operator is properly seated on the operator seat. Heretofore, the mountings for the operator presence sensing switches of these systems have suffered from one or more of the drawbacks of being too complex, of requiring constant adjustments and of not working well on slopes.

Thus, it will be appreciated that various aspects of the structure of conventional lawn and garden tractors are in need of improvement.

SUMMARY OF THE INVENTION

According to the present invention there is provided a lawn and garden tractor having a variety of improved features including: a main frame; an implement lift system; a steering system; hydrostatic transmission control system; engine combustion and cooling air system; and an operator presence sensing system.

An object of the invention is to provide a work vehicle having a main frame constructed only of relatively thin components that are fixed together by spot welds.

Another object of the invention is to provide a vehicle having a main frame, as set forth above, which embodies structure at its opposite ends for receiving ballasting weights.

Another object of the invention is to provide a work vehicle having a lift system adapted for raising and lowering front-, rear- or mid-mounted implements, the lift system incorporating a lift assist including an easily adjustable lift assist spring the effects of which may be locked out to permit the entire weight of attached implements to bias them downwardly.

Yet another object of the invention is to provide a lift assist, as set forth in the immediately preceding object, which further includes an optional lift assist kit useable, for example, when a snow thrower is mounted to the work vehicle, the lift assist kit including a gas spring arranged such that the lifting force exerted by an operator when raising the snow blower from its lowered working to its raised transport position remains substantially constant.

Another object of the invention is to provide a work vehicle equipped with a steering system incorporating a pitman arm having at least two selectable points of connection with the steerage linkage drag link whereby that point of connection resulting in the longest effective length of the arm can be selected when highly responsive steering is desired, such as when a mower is attached to the vehicle, and that point of connection resulting in the shorter effective length of the arm can be selected when low steering effort is desired, such as when the weight of a relatively heavy implement, such as a snowblower, is being borne by the steerable front wheels of the vehicle.

Still another object of the invention is to provide a work vehicle having an air intake system for ensuring that the air which passes into the engine for combustion is clean. More specifically, it is an object of the invention to provide an air supply means having two in-series screens or filters for ensuring clean combustion air. Yet more specifically, it is an object of the invention to provide, in combination with a vehicle having a radiator arranged horizontally above the vehicle engine, a first screen which extends above the upstream surface of the radiator and over the inlet to the combustion air cleaner.

Another specific object is to provide a work vehicle, as described in the immediately preceding object, with a second screen which lies directly over the radiator core and which cooperates with the first screen to prevent debris from collecting in the radiator core.

A further object is to provide a work vehicle having a seat equipped with an operator presence sensing means which is capable of sensing an operator's presence even though the vehicle may be working on a 15° slope. Specifically, it is an object of the invention to provide an operator presence sensing system including a beam extending transversely beneath the seat and being spring biased away therefrom by relatively soft spring means, the beam being carried by the seat suspension and biased toward the seat by relatively stiff spring means whereby only a small amount of force is required to be exerted downwardly on the seat to effect compression of the relatively soft spring means and closing of a switch means carried by the beam.

These and other objects will become apparent from a reading of the ensuing description together with the appended drawings.

BRIEF DESCRIPTION OF THE DRAWINGS

FIG. 6 is a left rear perspective view of the improved lift system of FIG. 4, but for the sake of clarity, showing the tractor main frame in dashed lines and with portions omitted.

FIGS. 9 and 9a are right side and rear views respectively of the steering pitman arm shown in FIG. 8.

FIG. 15 is a left rear perspective view showing a portion of the ground speed control mechanism for a hydrostatic transmission.

FIG. 15a is a right side elevational view of a portion of the speed control shown in FIG. 15.

FIG. 15b is a left rear perspective view showing a linkage interlocking the brake system with the speed control system shown in FIG. 15.

DESCRIPTION OF THE PREFERRED EMBODIMENT

Figure 1:
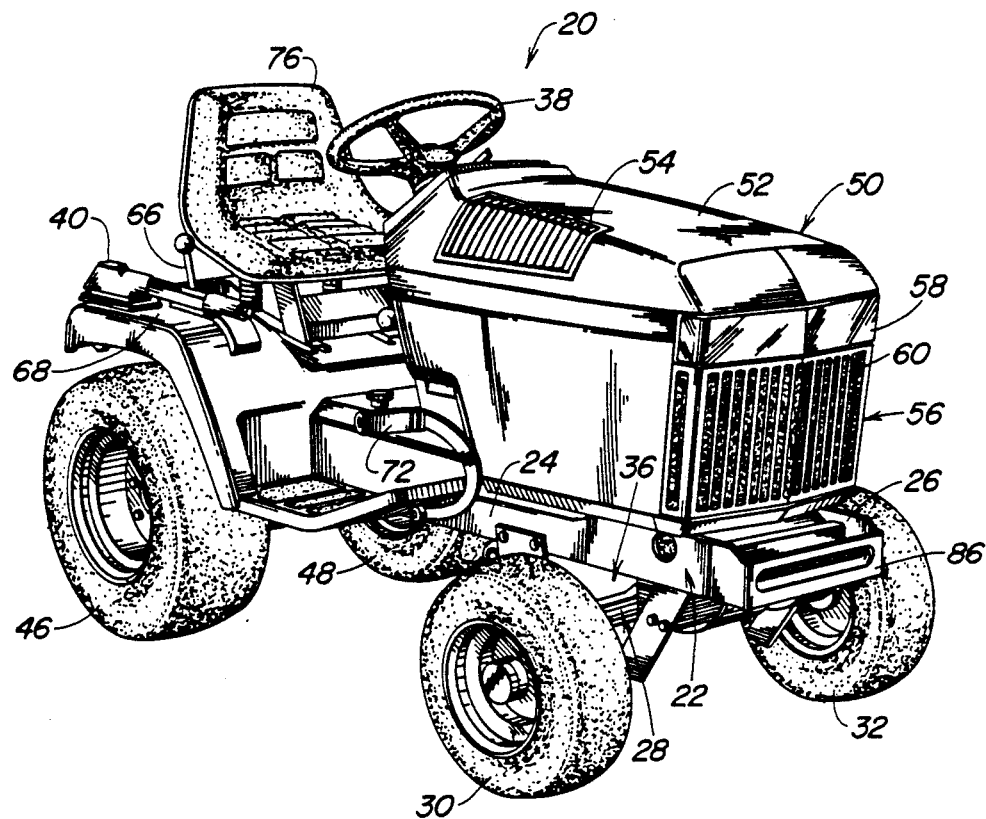
FIG. 1 is a right front perspective view of a work vehicle embodying the improvements of the present invention.
Figure 12:
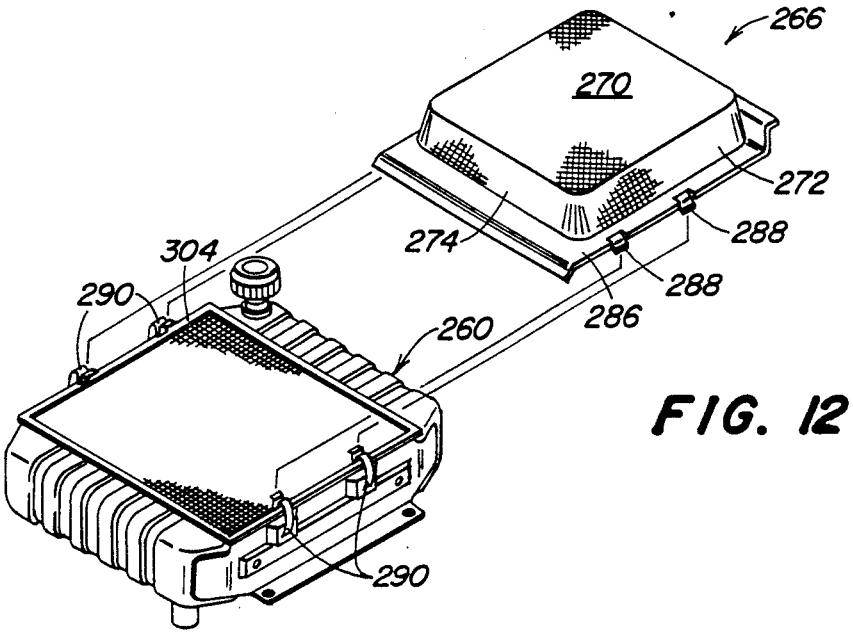
FIG. 12 is a perspective view showing a housing-like first screen removed from its normal mounting position covering the upstream face of the core portion of a horizontally disposed radiator, a second screen located directly on the core portion and releasable fastener means for engaging the first screen and clamping the latter downwardly against the second screen and the radiator.

Referring now to the drawings, therein is shown in work vehicle 20 (FIG. 1) including a longitudinally extending main frame 22 supported on a front pair of steerable wheels 30 and 32 and a rear pair of drive wheels 46 and 48. An engine 44 is supported on a forward portion of the frame 22 in a compartment 262 defined in part by a hood 50 formed of a single piece including opposite side walls extending beside the engine, a top wall extending over the engine and provided with a pair of air inlet grills 54 and a forward end portion 56 defined by a wrap around headlight assembly 58 disposed above an air exhaust grill 60.

Figure 16:
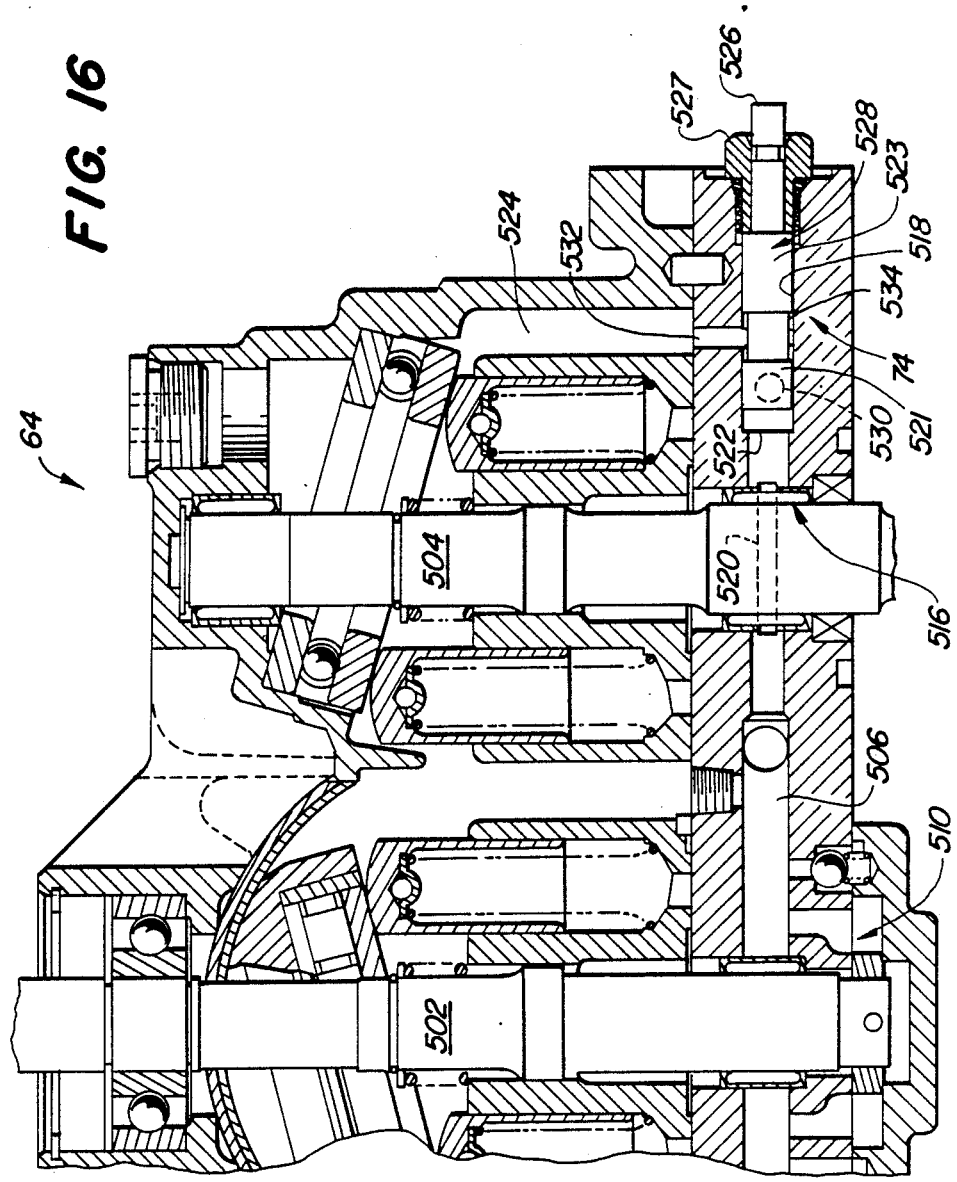
FIG. 16 is a sectional view taken through a vehicle hydrostatic transmission and showing a bypass valve for preventing pressure build-up and for thus permitting free wheeling when it is desired to move the vehicle while its engine is not running.

Mounted to the frame 22 rearwardly of the hood 50 is a combined operator platform and fender deck structure 68. A seat assembly 76 incorporating an operator presence sensing system 78 (FIG. 17a) or 78a (FIG. 18) is mounted to the structure 68 so as to position an operator within easy reach of a steering wheel 38 located forwardly of the seat and forming part of a steering system 36 (FIG. 8), a lift lever 100 projecting through a right hand fender of the structure 68 and forming part of an implement lift system 40 and an upright, transmission control lever 66 also projecting through the right hand fender and forming a part of a ground speed control system 70 (FIG. 15) provided for controlling the output speed and direction of a hydrostatic transmission 64 (FIG. 16).

Details of the Main Frame

Figure 2:
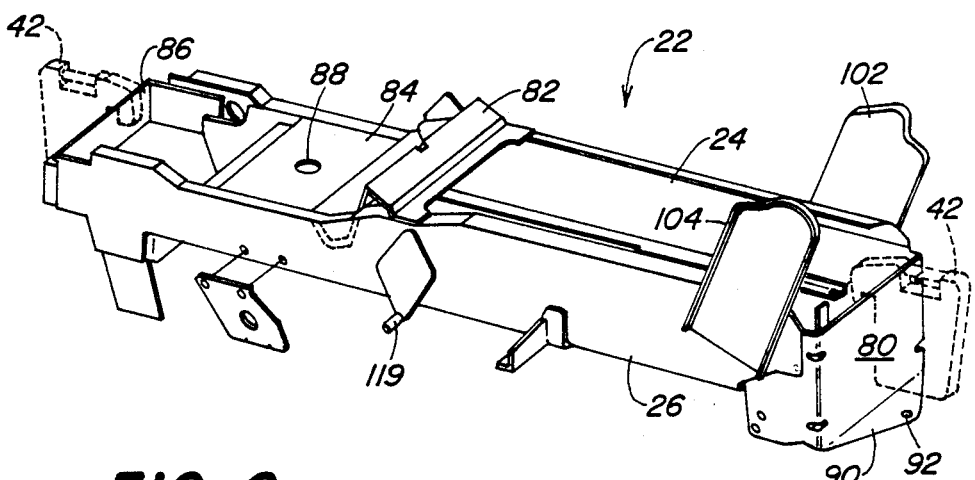
FIG. 2 is a somewhat schematic, left rear perspective view of the improved main frame of the work vehicle.

Referring now to FIG. 2, it can be seen that the main frame 22 includes transversely spaced, longitudinally extending right and left side frame members 24 and 26, respectively, connected together by four transverse frame members 80, 82, 84 and 86, the respective connections of the side members to the four transverse frame members being effected by spot welds preferably done by welding robots. The transverse frame members 80 and 86 are U-shaped in plan view and respectively form the rear and forward ends of the frame 22. Each of the members 80 and 86 is adapted for receiving a plurality of suitcase weights 42 whereby ballast may be added to either the rear or front of the tractor as may be desired to balance the weight of front- or rear-mounted implements. The rear frame member 80 has a triangular member 90 formed integrally with a lower edge thereof and projecting rearwardly at 90° thereto, the member 90 containing an aperture 92 for receiving a hitch pin for attaching various towed implements such as carts and the like. The towed implements can be attached even with the suitcase weights 42 in place on the member 80 as the member 90 is located so as to be spaced sufficiently below the weights to permit such attachment.

The transverse frame member 82 is connected to an upper portion of the side members 24 and 26 approximately midway between the front and rear ends thereof. The transverse frame member 84 is somewhat rectangular in plan view and positioned ahead of the member 82. The member 84 serves as a support for the engine 44 and contains an aperture 88 for receiving an output shaft of the engine. A pair of upright crankshaft supports 102 and 104 are respectively formed to and project upwardly from outer face locations of rear portions of the side members 24 and 26.

Combined Cooling and Combustion Air System

Referring now to FIGS. 1 and 11-14, there is shown a combined cooling and combustion-air system for the vehicle 20. Specifically, mounted to the top of the engine 46 is a radiator 260 which contains a source of cooling fluid for the engine. A fan is located above the engine 46 and beneath the radiator 260 and acts to draw air through the radiator via the grills 54 in the hood 50 and to exhaust air forwardly out the grill 60. A screen 266 is mounted to the top or upstream side of the radiator for preventing excess debris from being drawn into and possibly clogging the air passages of the radiator, the screen also extending over a combustion air cleaner inlet 268 located forwardly of the radiator so as to prevent large debris particles from entering the air cleaner. Specifically, the screen 266 consists of a top wall 270 joined to depending right and left side walls 272 and 276 and depending rear and front walls 274 and 278, these walls all being perforated throughout with apertures preferably having a diameter of approximately 1.14 millimeters which results in 36% of the area of these portions being open. A horizontal bottom or skirt member 286 is joined to and extends outwardly from the bottoms of the screen walls and has a forward portion extending rearwardly beneath a front portion of the top wall 270 and terminating at a rear edge 294 bordering a front edge of the core section of the radiator 260. An aperture 310 is provided in a forward portion of the member 286 and receives the inlet 268 of the air cleaner. Incorporated in opposite sides of the member 286 are slots 288 receiving ends of respective spring metal snap locks or latches 290 carried by the radiator 260 and serving to releasably clamp the screen 266 in place over the radiator and air cleaner inlet 268. A rectangular, horizontal second screen 304 is placed directly upon the core section of the radiator 260 and the member 286 engages the perimeter of the screen 304 and holds the latter firmly in place when the latches 290 are latched. The screen 304 preferably comprises wire mesh having approximately 2 millimeter square openings. The screen 304 operates to intercept any long strands of debris that pass through the screen 266 and thus prevents these long strands from hair-pinning on the radiator core. The screen 304 likewise intercepts fuzz-like particles which might otherwise collect on the radiator core. The respective sizes of the openings through the screens are such that only those types of particles that will easily pass through the radiator core will pass through both screens. In fact, field experience shows that this combination of screens eliminates the necessity for cleaning the radiator for the life of the vehicle.

Cleaning of the screens 266 and 304 may easily be accomplished by first pivoting the hood 50 upwardly about the conventional pivot connection (not shown) the lower front portion of the hood has with the tractor frame 22 to an open position exposing the screens for removal and then releasing the latches 190 and removing the screens. The lifting of the hood 50 is facilitated by the provision of a hand access recess 336 in a forward central location of an upper end of a steering shaft support pedestal 338, the recess being located to permit an operator to easily grasp the rear edge 339 of the hood 50 when the hood is in its closed position with the edge 339 disposed about the upper end of the pedestal.

To prevent air from entering the flow of cooling and combustion air from a location other than above the hood 50, baffles are provided internally of the hood. Specifically, referring to FIG. 14, it can been seen that a baffle 320 having a U-shaped opening 322 is fixed to the underside of the hood, the baffle having a seal which engages the periphery of the front and sides of screen member 286 when the hood is closed so as to prevent air from recirculating through the radiator thereby diminishing the cooling efficiency of the radiator. Working together with the baffle 320 is an upright baffle plate 324 which is mounted to the frame 22 at a location behind the engine 44.

Figure 14:
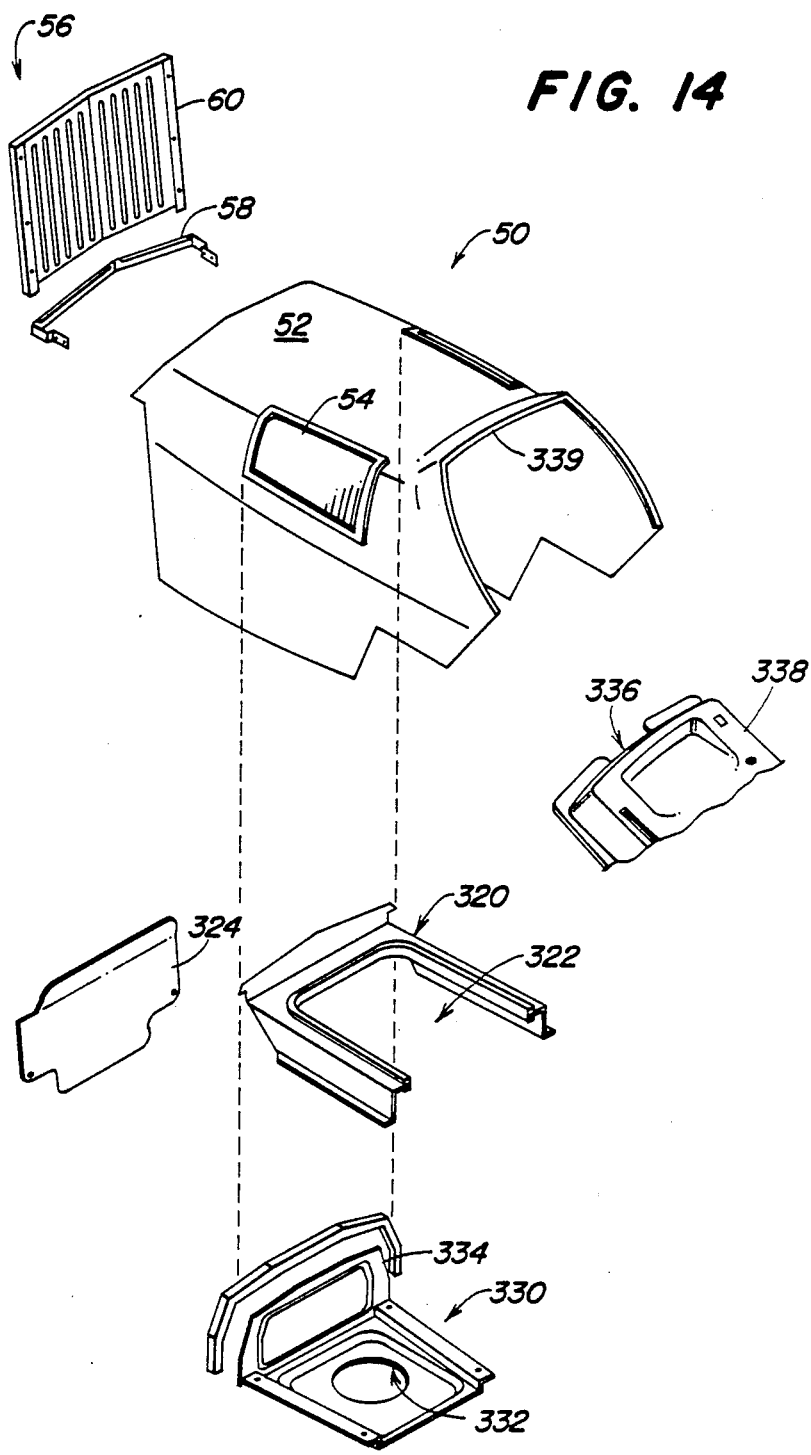
FIG. 14 is a partial exploded view showing the hood and associated baffles for ensuring that engine-heated air is not drawn through the engine radiator or cooling shroud.

Also shown in FIG. 14, is a baffle assembly 330 which would be provided in lieu of the baffle 320 for preventing the recirculation of cooling air through the cooling shroud of an air cooled engine (not shown) when the vehicle 20 is equipped with such an engine. When the vehicle 20 is equipped with an air cooled engine, the inlet grills 54 of the hood 50 are eliminated and air is drawn in from a zone rearwardly of the pedestal 338. The baffle 330 channels this air to an inlet defined by an upper portion of the shroud and for this purpose includes a horizontal portion that fits horizontally above the engine and is provided with an aperture 332 that registers with the cooling shroud inlet and includes an upright portion 334 having a seal fixed to its upper edge for engagement with the underside of the hood 50 when the latter is closed.

Lift System

As shown in FIGS. 3–7, the lift system 40 is mounted on the vehicle frame 22 for raising the lowering implements carried by the frame. The details of the different implements and their connections to the frame 22 are, the subject of co-pending commonly owned patent application Ser. No. 076,638 filed on July 23, 1987. Specifically, the lift system 40 comprises a plurality of horizontal, transverse rockshafts including a rear rockshaft 108, a mid-mounted set of rockshafts 117 and 118 and a forward rockshaft 150. The rear rockshaft 108 is journalled in the left upright support 104 and in a bracket 103 fixed to an upper rear location of the right upright support 102.

The mid-mounted rockshaft 117 has opposite end portions journalled in the side members 24 and 26 while the rockshaft 118 is tubular and is received over the rockshaft 117 for oscillating thereabout. Support plates are secured to and depend from outer forward surface locations of the frame side members 24 and 26 and the forward rockshaft 50 is journalled in the support plates. A plate-like crank arm 116 is fixed to the rockshaft 108 at a location just inside the support 102.

Figure 3:
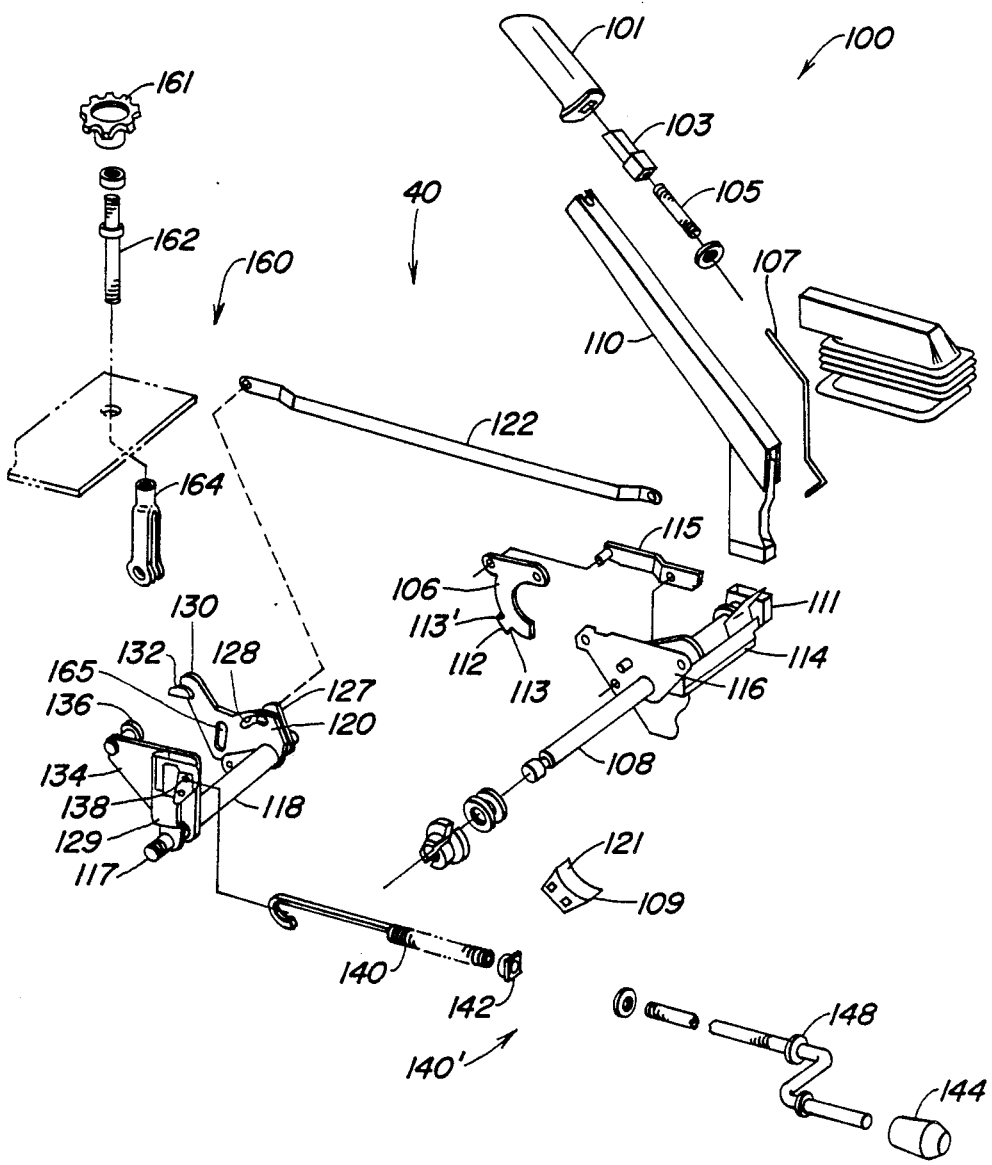
FIG. 3 is an exploded, left rear perspective view showing a portion of the improved lift system of the work vehicle.
Figure 4:
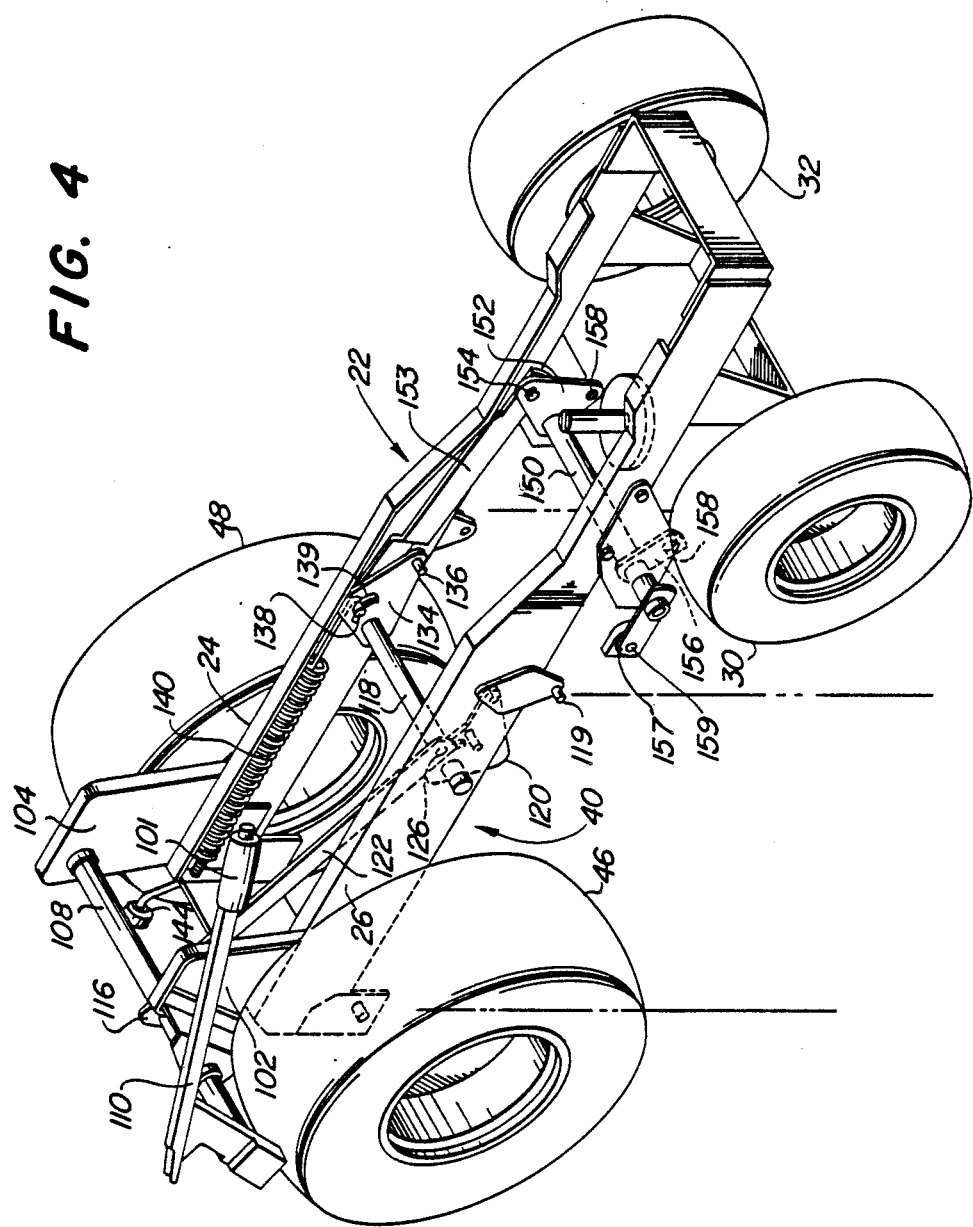
FIG. 4 is a right front perspective view showing the improved lift system mounted to the tractor main frame.
Figure 5:
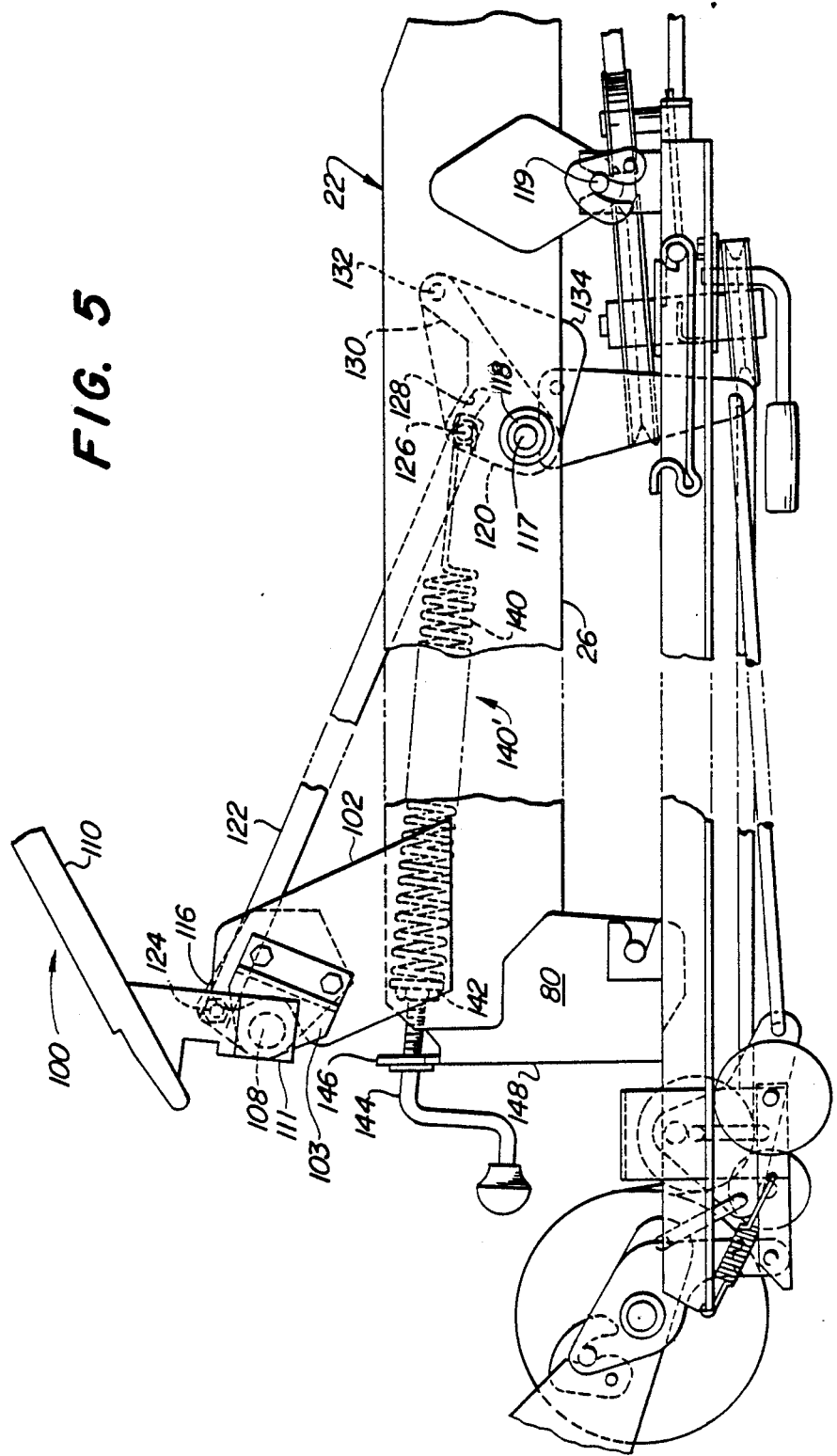
FIG. 5 is a right side elevational view of the mounted lift system of FIG. 4 but further showing the lift system coupled to a partially shown rear-mounted rotary tiller.

As can best be seen in FIG. 3, right and left hand arms 127 and 129, respectively, are fixed to the rockshaft 117 adjacent opposite ends of the outer rockshaft 118, the arm 127 being in substantial fore-and-aft alignment with the arm 116. Oscillating motion of the rear rockshaft 108 is transferred to the inner mid-mounted rockshaft 117 by a link 122 having its rear end pivotally connected to the arm 116 by a pin 124 and having its forward end pivotally connected to the arm 116 by a pin 124 and having its forward end pivotally connected to the arm 127 by a pin 126. Respectively fixed to the right-and-left-hand ends of the outer mid-mounted rockshaft 118 are a bell crank 120 and a crank arm 134, the bell crank 120 being coupled for being moved by motion of the link 122 by the pin 126 which projects into an arcuate lost-motion slot 128 provided in the crank 120. The bell crank 120 includes a forwardly projecting leg 130 having an inwardly projecting pin or stud 132 connected thereto. The crank arm 134 is in the form of a triangular plate and an inwardly projecting pin or stud 136 is connected to a corner of the arm in axial alignment with the pin 132 and cooperates with the latter for receiving respective ends of implement lift links (not shown) associated with a mid-mounted implement such as a mower, for example.

Fixed to the front rockshaft 150 at respective locations inboard of the frame side members 24 and 26 are a crank arm 152, in the form of a triangular plate, and a crank arm 156, in the form of a strap, the arms 152 and 156 being provided with respective axially aligned apertures 158 for cooperative attachment to respective lift links (not shown) of a front-mounted implement such as a blade or snowblower, for example. Motion of the outer mid-mounted rockshaft 118 is transferred to the rockshaft 150 by a link 153 having its rear end coupled to the arm 134, by a pin 138 received in an arcuate slot 139 provided in the arm, and having its forward end coupled to one corner of the arm 152 by a pin 154.

A lift handle 100 (FIG. 3) is provided for controlling the raising and lowering of implements carried by the vehicle and for controlling the operation of a latch mechanism 106' that operates to selectively lock the handle in a lowered, lift assist lockout position or a raised transport position. Specifically, the handle 100 includes a handle frame 110 fixed, as at 111, to a right hand end of the rear rockshaft 108 and projecting upwardly through an opening provided in a right hand fender of the combined operator station and fender deck 68 of the vehicle. The handle frame 110 includes a channel portion slidably supporting a rod 107 having a forward end carrying a button 103 that is received in and projects from a hand grip 101 that is fixed to a forward end of the channel portion. A spring 105 is received on the rod 107 and is compressed between the button 103 and a washer received on the rod and captured by the frame 110 so as to bias the button outwardly from the grip. The rear end of the rod is provided with an inturned end 107' located for engaging a tab 114' of a latch-operating arm 114 that is mounted for rotating freely about the shaft 108 with an inner end thereof bridging the support bracket 103. Positioned adjacent the inner end of the arm 114 and forming part of the latch mechanism 106' is a latch 106 in the form of an upright plate having a substantially semicircular clearance notch provided in a rear edge thereof with the shaft 108 passing freely through the notch. An arcuately shaped forward edge of the latch 106 is interrupted by a dove tail shaped projection 112 which cooperates with the arcuately shaped edge to define forward and rearward notches 113' and 113. A latch strike or bar 109 is bolted to an inner surface of the support 102 and has an upper arcuate surface 121 against which the projection 112 moves when passing between a transport latch position wherein the rearward notch 113 is engaged with a forward end of the strike 109 (FIG. 6) and an assist lock-out latch position wherein the forward notch 113' is engaged with a rearward end of the strike 109. Motion of the arm 114 is transferred to the latch 106 by a link 115, the forward end of the link carrying a pin received in an aperture provided in an upper forward location of the latch 106 and a mid location of the link being pinned to the arm 114.

An adjustable lift assist 140' is provided for counterbalancing the weight of either mid or rearwardly mounted implements that are coupled for being raised and lowered in response to rocking the rockshaft 118. Specifically, the assist 140' includes a coil tension spring 140 having a hook at its forward end connected to the arm 129 carried by the left end of the inner mid-mounted rockshaft 117. The rear end of the spring 140 has a spring retainer 142 secured thereto, the retainer being provided with a threaded hole receiving a threaded end of a manually operable screw crank 144 that is rotatably mounted in a tab 146 connected to and projecting upwardly from an upper left hand portion of the web of the rear frame member 80. An abutment 148 is fixed to the screw crank 144 and engages the tab 146 so as to prevent the crank from shifting forwardly in the tab. Thus, the spring 140 exerts a pulling force on the arm 129 which by virtue of the shaft 117, arm 127 and pin 126 results in a lifting force being applied to the bell crank 130 and, by virtue of the shaft 118, results in a lifting force being applied to the crank arm 134.

It is desirable that some implements, a tiller for example, operate with the full weight thereof biasing them toward the ground. This result is accomplished in the present invention by locking out the lift assist 140' by rotating the lift handle 100 downwardly sufficiently far that the latch projection 112 moves past the rear end of the strike 109 whereupon the latch notch 113 becomes engaged with the end of the strike. Release of the latch 106 is effected by pushing down on the handle 100 to release the tension on the latch and then by depressing the button 103 to cause the rod end 107' to rotate the arm 114 and disengage the latch notch 113 from the strike 109.

Figure 7:
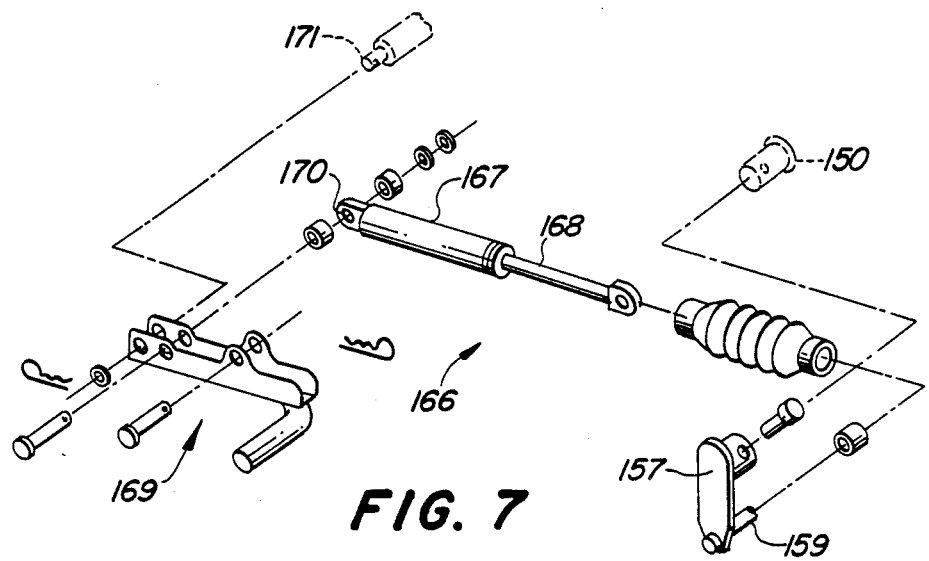
FIG. 7 is a right front exploded view of a gas spring lift assist which optionally may be incorporated in and form part of the lift system shown in FIG. 4.
Figure 7A:
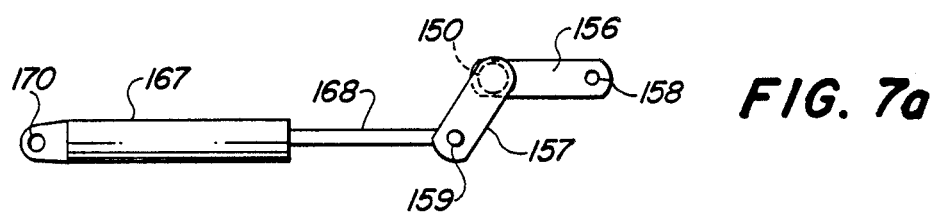
FIG. 7a is a partial schematic view of the gas spring shown in FIG. 7, with the gas spring being shown in its maximum assist position corresponding to a raised position of a front-mounted implement.
Figure 7B:
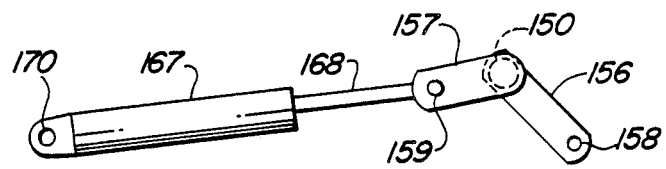
FIG. 7b is a view like 7a, but showing the gas spring in its minimum assist position corresponding to a lowered position of a front-mounted implement.
Figure 7C:
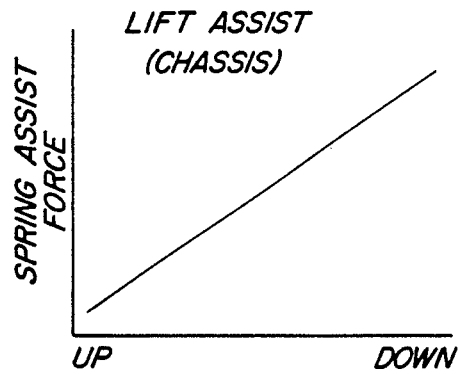
FIGS. 7c–7e respectively show graphs of the tension spring assist force versus implement position, the gas spring assist force versus implement position and of the combined or resultant tension and gas spring forces versus implement position.
Figure 7D:
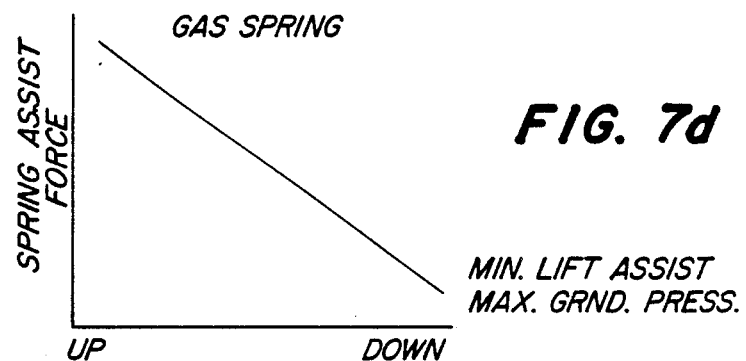
Figure 7E:
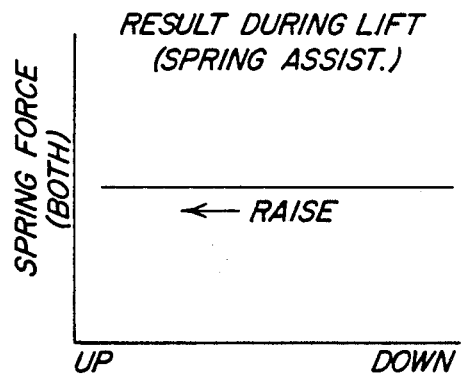

When a relatively heavy forwardly mounted implement such as a snowblower, for example, is coupled to the vehicle, it may be desirable to provide an auxiliary lift assist 166 (FIGS. 7–7b). Specifically, the lift assist 166 comprises a gas spring including a cylinder 167 and a piston rod 168, the latter being pivotally received on a stud 159 carried by a crank arm 157 that is removably pinned to the right hand end of the rockshaft 150. The cylinder 167, is received within a channel shaped frame 169 and has an apertured connector 170 joined to its rear end and pinned to the frame. The rear end of the frame 169 is in turn pivotally received on a stud 171 projecting rightwardly from a frame (not shown) forming part of the forwardly attached implement, the latter being latched to out-turned implement attachment studs or pins 119 (FIGS. 4 and 5) carried by supports fixed to outer surface portions of the vehicle frame side members 24 and 26 at a location spaced forwardly of the mid-mounted rockshafts 117 and 118. The geometrical relationship of the crank arm 157 to the crank arms 152 and 158, to which lift links of a forwardly mounted implement would be attached, is such that when the implement is in a lowered position (FIG. 7b) the gas spring is in substantial alignment with the rockshaft 150 and thus does not exert much lifting force. As rockshaft 150 is rocked to raise the arms 152 and 158, the assist force increases. The graph depicted in FIG. 7d shows this increase in force as an implement is raised. This arrangement of the gas spring is important when operating a snowblower, for example, since it is desired that the full weight of the snowblower act to aid in snow being scraped from a driveway or sidewalk, for example. Of course, the lift assist 140' will be locked out at this time. When it is desired to raise the snowblower for transport, the lift handle 100 is operated to place the lift assist 140' into operation. It will be appreciated that the spring 140 is at its maximum stretch and hence exerts maximum lift assist when an implement is completely lowered and that this assist decreases as an implement is raised. This operation is depicted in the graph shown in FIG. 7c. FIG. 7e graphically shows that the resultant of the lift assist force provided by the spring 140 and the gas spring 167, 168 over the lift range is a constant force thereby making it possible for an operator to lift a relatively heavy implement by exerting only a relatively moderate constant effort.

An adjustable depth stop 160 (FIGS. 3 and 6) is incorporated into the lift system 40 for the purpose of controlling the height of cut of a mid-mounted mower, for example, and includes a knob 161 fixed to the upper end of a threaded rod 162 extending vertically through an aperture provided in a support plate 163 which extends between and is fixed to upper surface portions of the frame side members 24, 26. Fixed on the rod 162 is a collar which prevents the rod from shifting downwardly through the aperture. A yoke 164 is adjustable threaded onto the lower portion of the rod 162 and has opposite legs located on opposite sides of the bell crank 120 and joined together by a pin 165' that is received in an upright lost-motion slot 165 provided in the bell crank 120. Thus, it will be appreciated that maximum depth will be provided by turning the knob to dispose the pin 165' in the bottom of the slot 165 when the hand lever 100 is in its raised position, this condition being shown in FIG. 6. Lesser depths can, of course, be established by positioning the pin 165' at other locations within the slot 165.

Steering Effort and Responsiveness Adjustment

Figure 8:
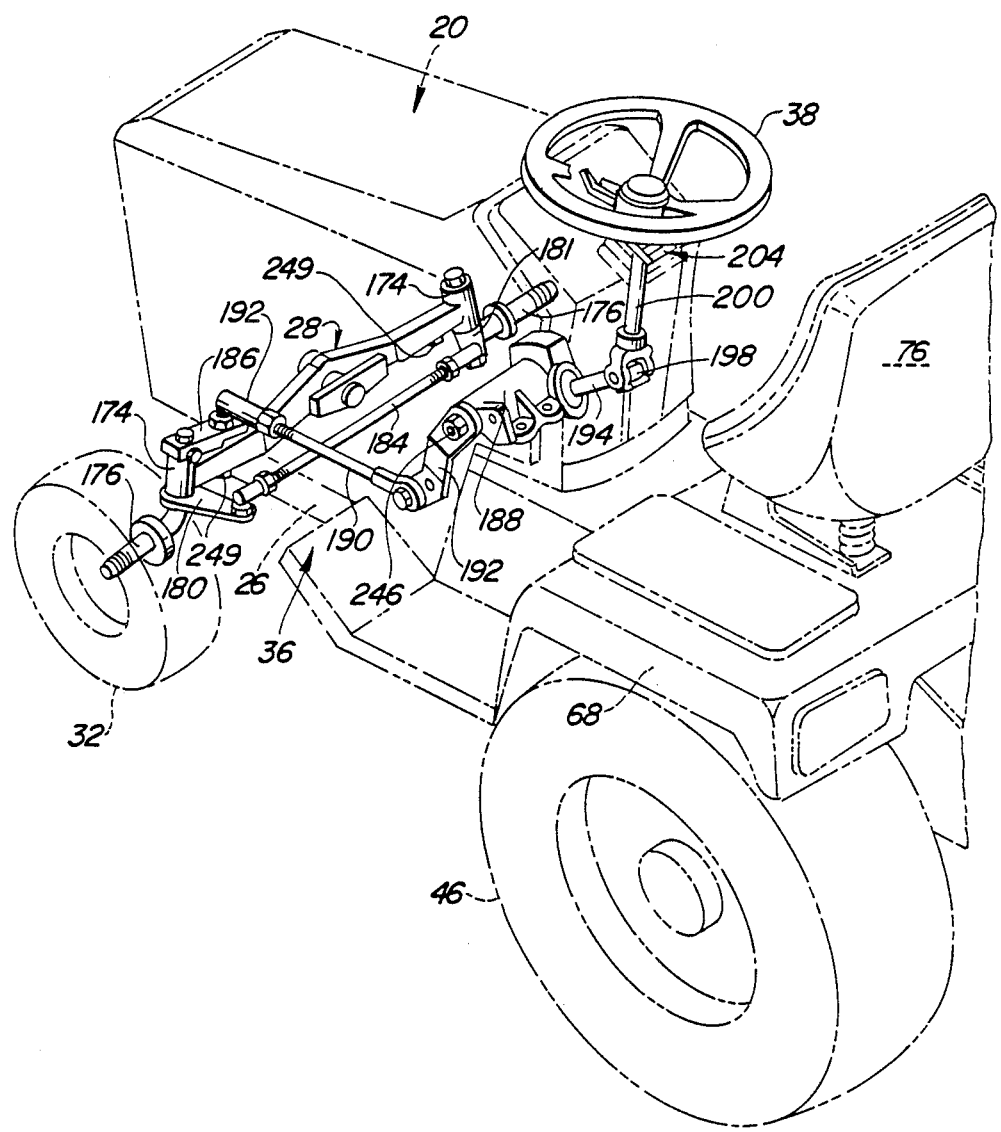
FIG. 8 is a right rear perspective view of that portion of the improved steering system relating to steering responsiveness and effort.

Referring now to FIGS. 8, 9 and 9a, that portion of the steering system 36 relating to the adjustable steering effort and responsiveness aspect will now be described in detail. Fixed to the opposite ends of the front axle 28 are upright cylindrical receptacles 174 in which respective upright portions a pair of L-shaped spindles 176 are swivelably received, the front wheels 30 and 32 being mounted to respective out turned portions of the pair of spindles. Left and right arms 180 and 181 are respectively fixed to the respective upright portions of the spindles 176 at locations below the receptacles 174, the arms 180 and 181 being interconnected by a tie rod 184 and limited in their turning movement by stop blocks 249 fixed to the underside of the axle 28. A steering control arm 186 is fixed to an upper end of the upright portion of the left spindle 176. A drag link 190 has its forward end connected to the arm 186 by a ball joint connector 191 and has its rearward end connected to a lower end of a pitman arm 192 having its upper end fixed, as at 246, to an output shaft of a conventional steering gear box 188. An input shaft 194 extends into the gear box 188 and has an upper end universally coupled, as at 198, to a lower end of a steering column 200 having the steering wheel 38 fixed to the upper end thereof. Then, it will be appreciated that steering is accomplished in the usual way by turning the steering wheel 38 one way or the other for steering the wheels within a range of movement determined by the stop blocks 249, with lock-to-lock movement of the steering wheel corresponding to that for moving the wheels 30 and 32 between maximum right- and left-turn positions.

The amount of turning resistance of the wheels 30 and 32 is dependent upon the weight carried by the wheels and thus may change when different implements are mounted on the vehicle. For example, considerably more weight is carried by the wheels when a snowblower is mounted to the front of the vehicle than when a mower is mounted to the midsection of the vehicle. Therefore, it is desirable to have a steering system which will require only a reasonable amount of effort to be exerted when operating a snowblower, for example. On the other hand, mowing operations are normally done at higher speeds than snowblowing operations and in areas containing more obstacles than areas where snowblowing is done. Therefore, it is desirable to have a steering system which will be responsive so that the vehicle may be quickly maneuvered during mowing operation.

For the purpose of optimizing the steering effort when operating a snowblower, for example, and the steering responsiveness when operating a mower, for example, the effective length or radius arm of the pitman arm 192 is made adjustable. Specifically, with respect to the connection 246, the arm 192 is provided with inner and outer points of connection 240 and 242, respectively. The inner connection 240 is connected to the drag link 190 when it is desired that the effort be optimized while the outer connection 242 is connected to the drag link when it is desired that the responsiveness be optimized. It is noted that with one arrangement of the invention, the steering wheel 36 required 3.0 turns lock-to-lock when using the shorter effective length of the pitman arm 192 and 2.25 turns lock-to-lock when using the longer effective length of the pitman arm.

Steering Wheel Tilt Mechanism

Figure 10:
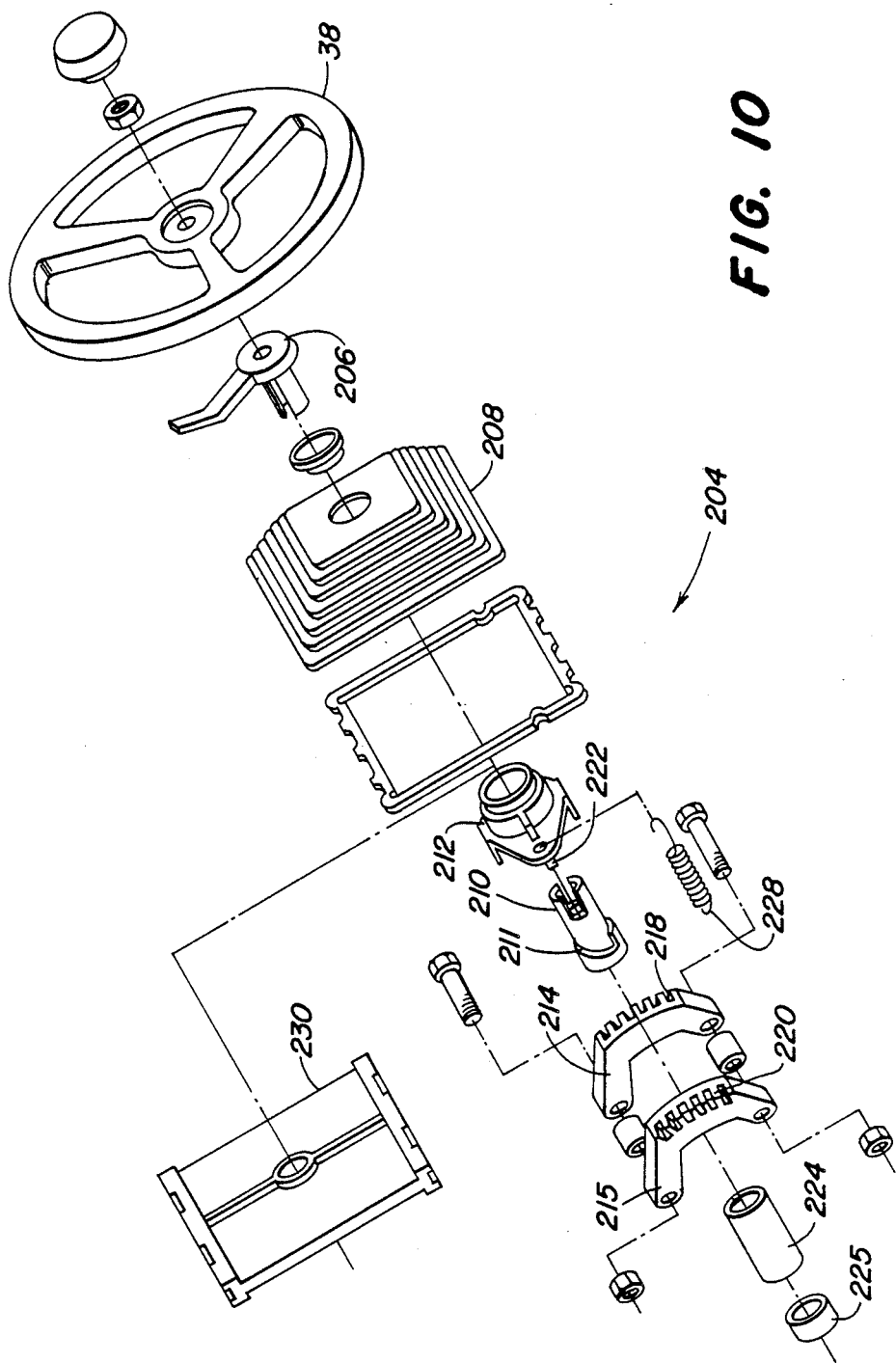
FIG. 10 is an exploded view showing the tiltable steering wheel structure of the improved steering system.
Figure 11:
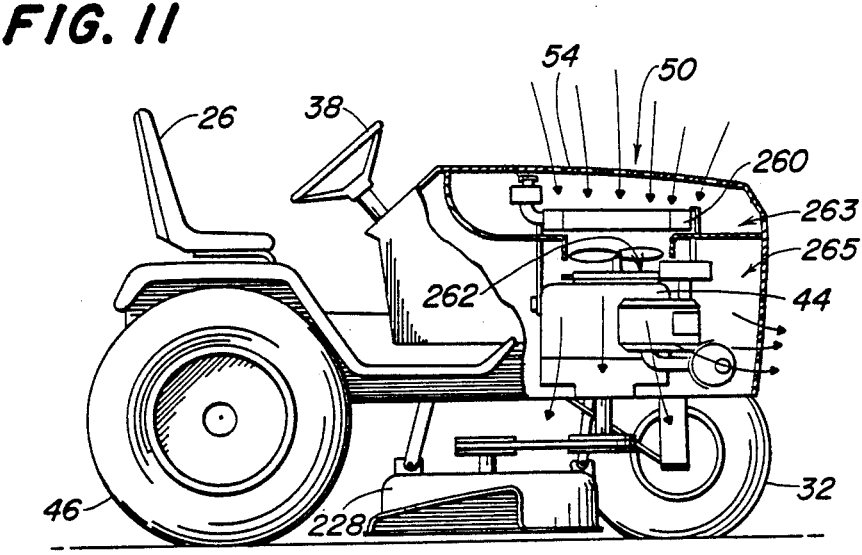
FIG. 11 is a somewhat schematic, right side elevational view, with portions broken away, of a work vehicle equipped with a horizontal radiator located above the engine.
Figure 12A:
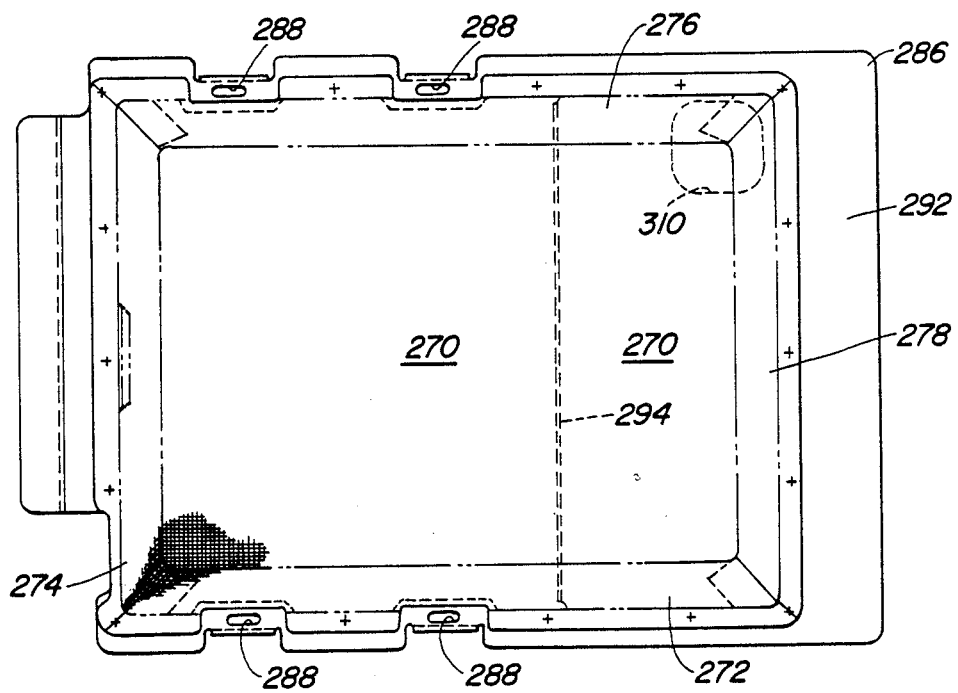
FIG. 12a is a top plan view of the first screen shown in FIG. 12.
Figure 13:
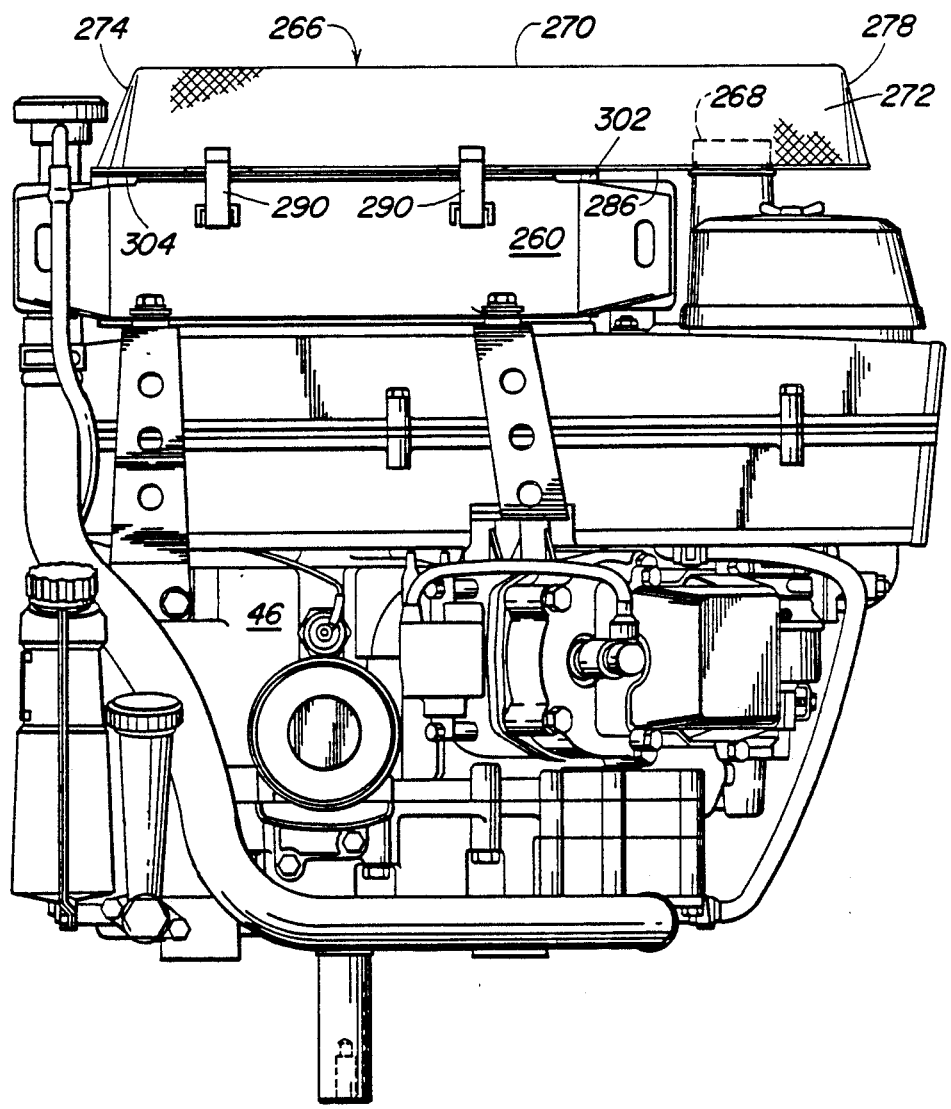
FIG. 13 is a side elevational view showing the radiator and screen of FIG. 12 mounted to an internal combustion engine.

Referring now to FIG. 10, there is shown a steering wheel tilt mechanism 204 which includes a series of elements received on the column 200. Specifically, a support collar 225 is fixed to the column at a preselected distance from the top of the column Resting on the collar 225 is a cylindrical spacer 224 and resting on the spacer is a sleeve 210 having an enlarged lower end defining an upwardly directed ramp or cam surface 211. A collar-like latch element 212 is received over a top portion of the sleeve 210 and includes a ramp surface (not shown) on its lower surface which is complimentary to and rests against the surface 211 so that counterclockwise rotation of the sleeve 210 causes the latch element 212 to shift upwardly. Right and left substantially arcuate position guides 214 and 215 are bolted together in fixed parallel relationship and are rigidly mounted to a dash support (not shown) so as to be on opposite sides of the sleeve 210. Each of the guides 214 and 215 includes a rack of teeth 220 having notches 218 therebetween with the teeth being arranged arcuately about a horizontal transverse axis passing through the universal joint 198 of the steering column 200 (FIG. 8). The latch element 212 includes a pair of downwardly projecting lugs 222 (only one shown) releasably received in a selected transversely aligned set of the notches 218. A pair of springs 228 (only one shown) have upper ends bent into a hook received in an aperture of a respective one of oppositely projecting ears of the latch element 212 and lower ends bent into a hook received in a respective aperture of a fixed support (not shown) so that they act to bias the latch element against the cam surface 211 of the sleeve 210 and to releasably retain the lugs 222 in the notches 218. The latch element 212 also includes a pair of downwardly projecting tabs 223 that extend between and cooperate with facing flat surfaces of the guide members 214 and 215 to restrain the column 200 from tilting sideways at the universal joint 198. A latch release lever 206 includes a sleeve received on the upper end of the column 200 and over the upper portion of the sleeve 210. The sleeve of the lever 206 is provided with diametrically opposite, longitudinally extending indentations (only one shown) that are drivingly engaged with diametrically opposite axially extending notches provided in the upper end of the sleeve 210. A flexible dust cover or boot 208 is received over the column 200 beneath the lever 206 and includes a lower rectangular end that is adapted for being inserted in a rectangular opening provided in a dash (not shown) and releasably engaged with a rectangular edge of the dash delineating the opening.

Adjustment of the tilt of the steering wheel can thus be accomplished by rotating the lever downwardly or counterclockwise to effect raising of the latch element 212 so as to withdraw the lugs 222 from a given set of the notches 218. The steering wheel 38 together with the column 200 is then adjusted to a desired new angular position relative to the universal joint 198. The lever 206 is then released and returned to its upward position whereupon the springs 228 act to shift the latch element 212 downwardly to engage the lugs 222 with a new set of the notches 218.

It is noted that the tilt mechanism may be omitted, if desired, in which case a rectangular retainer 230 is placed over the column 200 and fixedly positioned in the rectangular dash opening so as to hold the column in a fixed position.

Speed & Direction Control for Hydrostatic Transmission

Referring now to FIGS. 15, 15a and 15b, the details of the ground speed control system 70 for controlling the operation of the reversible hydrostatic transmission 64 (FIG. 16) will be described in detail. Specifically, the system 70 includes a oscillatable transverse transmission control shaft 360 which is connected, in a conventional manner not shown, to effect movement of the transmission pump swash plate in increasing amounts to opposite sides of a centered neutral position to thereby effect increasing forward and reverse driving speeds. A transmission control arm 358 includes a block-like mounting portion 366, clamped to the shaft 360, and upper forward and rearward extensions 430, 400 and 380, respectively, formed integrally with the mounting portion 366. The rearward extension 380 terminates in a curved portion 368 having a rearwardly facing cam surface 370 disposed arcuately about the axis of the control shaft 360 and in which a V-notch 384 is formed so as to divide the surface into upper and lower surface portions 372 and 374, respectively, with the surface portion 372 being the longer of the two to accommodate a wider range of forward than rearward operating speeds as will be apparent from the description below.

A first control input to the control arm 358 is received at the upper extension 430 and is provided by the transmission control lever 66, the latter being coupled, by a U-shaped member 352, to a rotatably mounted cross shaft 354 which in turn includes a depending arm 361 that is interconnected with the upper extension 430 by a connecting rod 362. The connecting rod 362 is made to be adjustable in length, for a purpose explained below, by the provision of a universal connector 434 threaded onto the forward end of the rod 362 and held in place by a jam nut 438.

A second control input to the control arm 358 is received at the forward extension 400 and is provided by a brake pedal 72 having its lower end fixed to an outboard end of a cross shaft 150 rotatably mounted in the frame members 24 and 26. A brake control shaft 408 is rotatably mounted in the frame members at a location rearwardly of the shaft 150 and adjacent the forward extension 400 of the control arm 358. A motion transfer link 418 is coupled between an upper end of an arm fixed to and projecting upwardly from the shaft 150 and a lower end of an arm fixed to and depending from the shaft 408. A cam plate 402 is fixed to the shaft 408 and is provided with an opening 410 defining a cam surface 414. A cam follower in the form of a roller 412 (FIG. 15a) is received on a cylindrical pin 404 which is eccentrically pivotally mounted to the forward extension 400 of the control arm 358, the roller being disposed within the cam plate opening 410 for engagement by the cam surface 414 when the brake pedal 72 is depressed, the shape of the cam surface being such as to return the control arm 358 to its neutral position so as to neutralize the transmission. Of course, the transmission control lever 66 will also be returned to neutral. However, the shape of the cam plate opening 410 is such that with the brake pedal 72 released, the roller 412 will move freely within the opening when the lever 66 is shifted fore-and-aft from its neutral position to effect forward and reverse driving conditions in the transmission.

A neutralizing assist 379 is associated with the curved portion 370 of the control arm 358 so as to ensure that the control arm is precisely placed in neutral whenever the control lever 66 is placed in its neutral position or when the brake pedal 72 is depressed. Specifically, the assist 379 includes a roller support arm 388 having its lower end pivotally received on a cylindrical pin 392 that is selectively pivotably about and held in place by a cap screw 396 that passes eccentrically through the pin 392. The cylindrical pin 392 is mounted adjacent the control arm curved portion 368 and a roller 390 is mounted to the upper end of the arm 388 and held into engagement with the cam surface 370 by a coil tension spring 440 having hooks formed on its opposite ends and respectively secured in place by the fasteners holding the rollers 390 and 412 in place. When the control lever 66 is in or near a full forward speed position, the transmission control arm 358, as viewed from the left in FIG. 15, will be in or near a full clockwise position and the roller 390 will be engaged with an upper end of the upper cam surface portion 372. As the control lever 66 is moved back towards its neutral position, the arm 358 will pivot counterclockwise and the surface portion 372 will travel upwardly relative to and the notch 384 will approach the roller 390. The shape of the V-notch 384 is designed such that when the roller 390 is just about to enter the notch, the transmission will be slowed to the extent that the vehicle will now be traveling forwardly at about ½ mph. This is the minimum operating speed of the vehicle since the action of the spring 440 will immediately neutralize the arm 358 once the roller 390 moves over the edge of the notch. When the control lever 66 in or near a full rearward speed position, the control arm will be at or near its full counterclockwise position and the roller 390 will be engaged with a lower end of the lower surface portion 374. As the control lever is moved back towards its neutral position, the arm 358 will pivot clockwise and the surface portion 374 will travel downwardly relative to and the notch 384 will approach the roller 390. Again, because of the shape of the notch 384, the vehicle travel speed will be about ½ mph in reverse when the roller 390 is just about to enter the notch with the action of the spring 440 acting to immediately neutralize the arm 358 once the roller moves over the edge of the notch.

The eccentric mountings of the cylindrical pins 392 and 404 allow for quick, easy and accurate adjustment of the positions of the rollers 390 and 412 so that when the control arm 358 is positioned in its neutral position corresponding to the neutral position of the hydrostatic transmission the roller 390 will be centered in the V-notch 384 and when the brake pedal 72 is depressed, the roller 412 will cooperate with the cam surface 414 to return the arm 358 to its neutral position from any other position. Of course, the length of the connecting link 362 can be adjusted to ensure that the control arm 358 is in neutral when the control lever 66 is in neutral.

Hydrostatic Transmission Bypass or Free Wheeling Valve Assembly

The structure for establishing a bypass or free wheel condition in the hydrostatic transmission 64 for permitting the vehicle to be moved when the engine is not running will now be described with reference to FIG. 16. Specifically, the transmission 64 includes a pump 502, mounted to an input shaft for being driven by the latter, and a motor 504 mounted on an output shaft for driving the latter. Coupled to the pump input shaft is a charge pump 510 which supplies fluid to a passage 506 when the vehicle engine is in operation. The passage 506 is coupled to one side of an annular groove 520 that permits fluid to flow about a bearing 516 supporting the motor output shaft 504. A bypass valve assembly 74 includes a valve bore 518 having an inner end intersecting the annular groove 520 and defining a shoulder 522 spaced and facing outwardly from the shaft 504. A passage 520 is connected for receiving pressure fluid delivered by the motor 504 when the latter is driven by way of its driving connection with the wheels 46 when the vehicle is being moved with the engine not running. A bypass passage 532 spaced axially outwardly from the passage 530 connects the valve bore 518 with a cavity 524 surrounding the pump and motor units. A valve spool 528 is axially shiftably received in the bore 518 and includes an outer end defined by an operating stem 526 that is reciprocably received in a throughbore provided in a cap 527 threaded into the outer end of the bore 518. The spool 528 further includes an inner end defined by an inner land 521 and an outer land 523 spaced axially outwardly of the land 521. When the valve spool 528 is in an outward closed position, as shown, the inner land 521 is positioned in blocking relationship to the passage 530 and is spaced axially outwardly from the shoulder 522. At this time, the outer end of the outer land 523 will be seated against the inner end of the cap 527. When the valve spool 528 is shifted inwardly to its open position, the inner land 521 will be seated against the shoulder 522 and the bypass passage 530 will be unblocked so that it is in fluid communication with the cavity 524 via an annular groove 534 defined between the lands 521 and 523 and the bypass passage 532.

Thus, it will be appreciated that anytime the vehicle engine is operating, the charge pump 510 will be pumping fluid and the pressure of this fluid will act on the inner end of the spool 528 so as to shift the latter to and/or hold the latter in its closed position so as to prevent working fluid from being bypassed to the cavity 524. However, with the engine stopped, the charge pump 510 will no longer by supplying pressure and if it is then desired to push or pull the tractor as may be necessary for service, this may be done without encountering back pressure that would be developed in the transmission due to the driving of the motor by merely pushing in on the stem 526 of the valve spool so as to place the valve spool in its open position.

Operator Presence Sensing Switch Mounting

Figure 17:
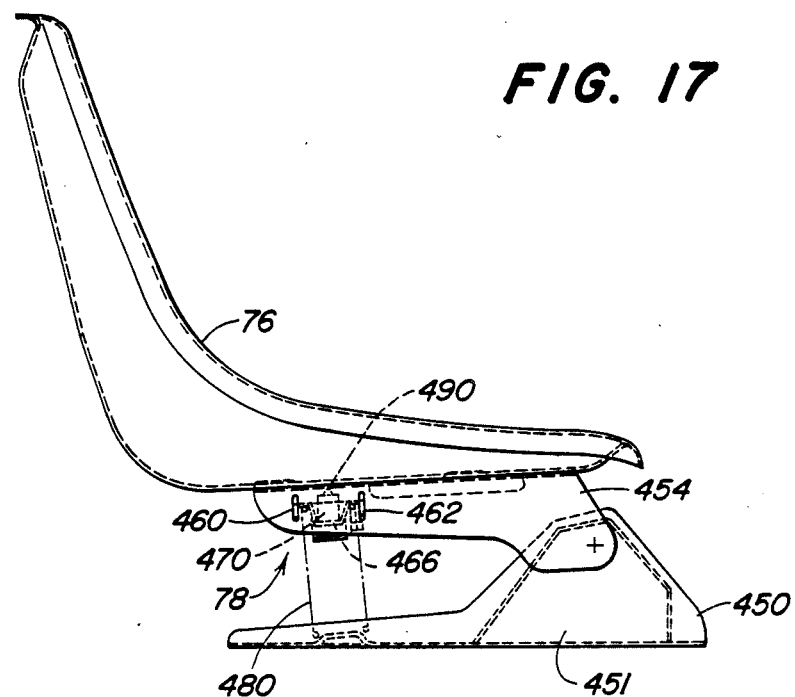
FIG. 17 is a right side elevational view of an operator seat structure embodying one version of an operator pressure sensing switch mounting made in accordance with the present invention.
Figure 17A:
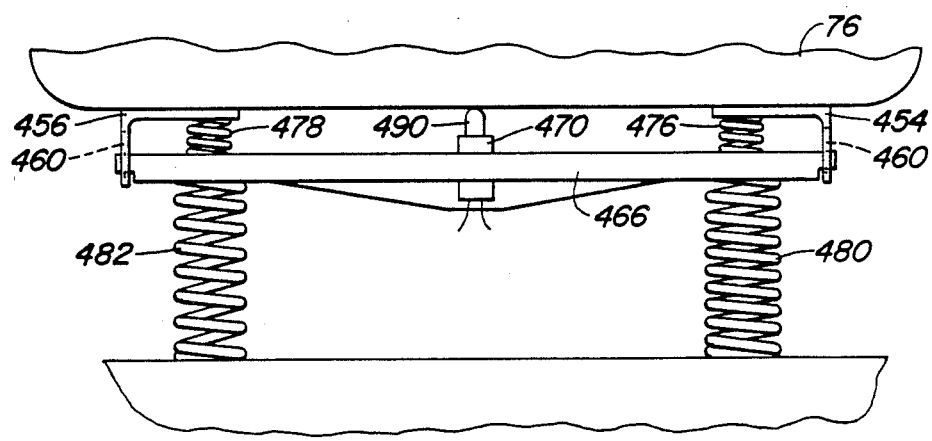
FIG. 17a is a partial rear view of the seat structure and switch mounting shown in FIG. 17.
Figure 17B:
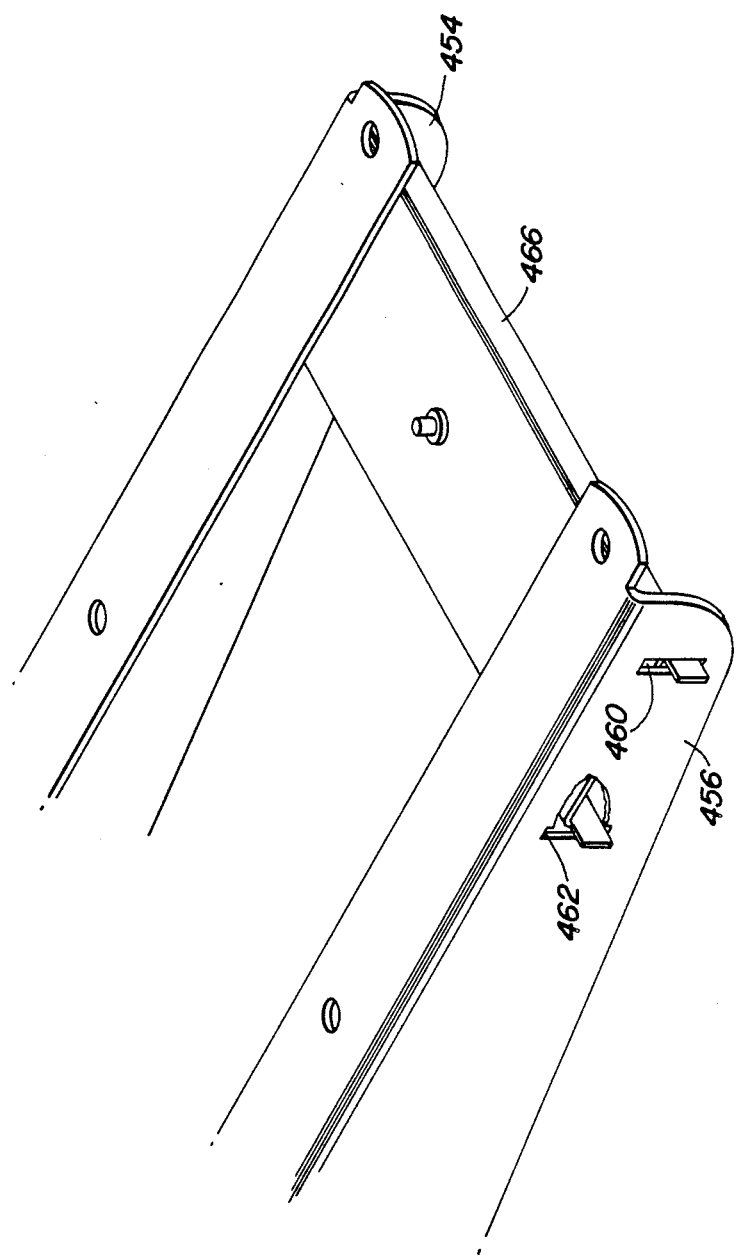
FIG. 17b is a partial perspective view illustrating the switch support beam of the seat structure shown in FIG. 17.

Referring now to FIGS. 17–17b, there is shown an operator presence sensing switch mounting 78 associated with the suspension for the operator seat 76. Specifically, fixed to a central portion of the combined platform and fender deck 68 is a lower seat support bracket 450 including a pair of transversely spaced, upright legs 451. Pivotally connected to the respective legs 451 are the forward ends of a pair of upper seat support brackets 454 and 456 which are L-shaped in cross-section and are fixed to the bottom of the seat 76. In respective rear portions of each of respective depending legs of the seat brackets is formed a set of spaced rear and front vertically elongated apertures 460 and 462. A channel-like beam 466 has opposite ends each provided with a set of front and rear tabs respectively received in an adjacent set of the apertures 460 and 462, the tabs having a height less than that of the apertures which allows the beam to move vertically relative to the brackets 454 and 456. Mounted to a central location of the beam 466 between opposite ends thereof is a conventional operator presence sensing switch 470 forming part of a conventional safety interlock system (not shown) and having an upwardly projecting plunger 490. A pair of relatively soft springs 476 and 478, i.e., springs having a relatively low spring rate, have their respective lower ends received in wells, provided in the upper surface of the beam 466 adjacent opposite ends thereof, and their respective upper ends engaged with respective horizontal legs of the brackets 454 and 456. The springs 476 and 478 are normally under compression and act to bias the beam 466 away from the seat 76 whereby the set of tabs at the opposite ends of the beam 466 normally occupy the bottoms of the apertures 460 and 462 and the switch plunger 490 is normally fully extended. Additionally, a pair of relatively stiff springs 480 and 482, i.e., springs having a relatively high spring rate and therefore having much greater resistance to compression than the springs 476 and 478, are positioned beneath the beam in respective locations in axial alignment with the springs 476 and 478, the springs 480 and 482 normally being in an uncompressed state wherein they support the beam 466 and hence the rear portion of the seat 76. The relatively soft springs 476 and 478 will become completely compressed under a load as small as approximately 20 Kg with the result that the seat 76 will travel towards the beam 466 and depress the plunger 490 to close the switch 470. The plunger 490 is positioned such that it will remain depressed as long as at least one or the other of the springs 476 and 478 is compressed which compression will occur even if the vehicle is operating on a hillside having up to a 15° slope or if the vehicle is operating on rough terrain unless the operator is bounced completely off the seat.

Figure 18:
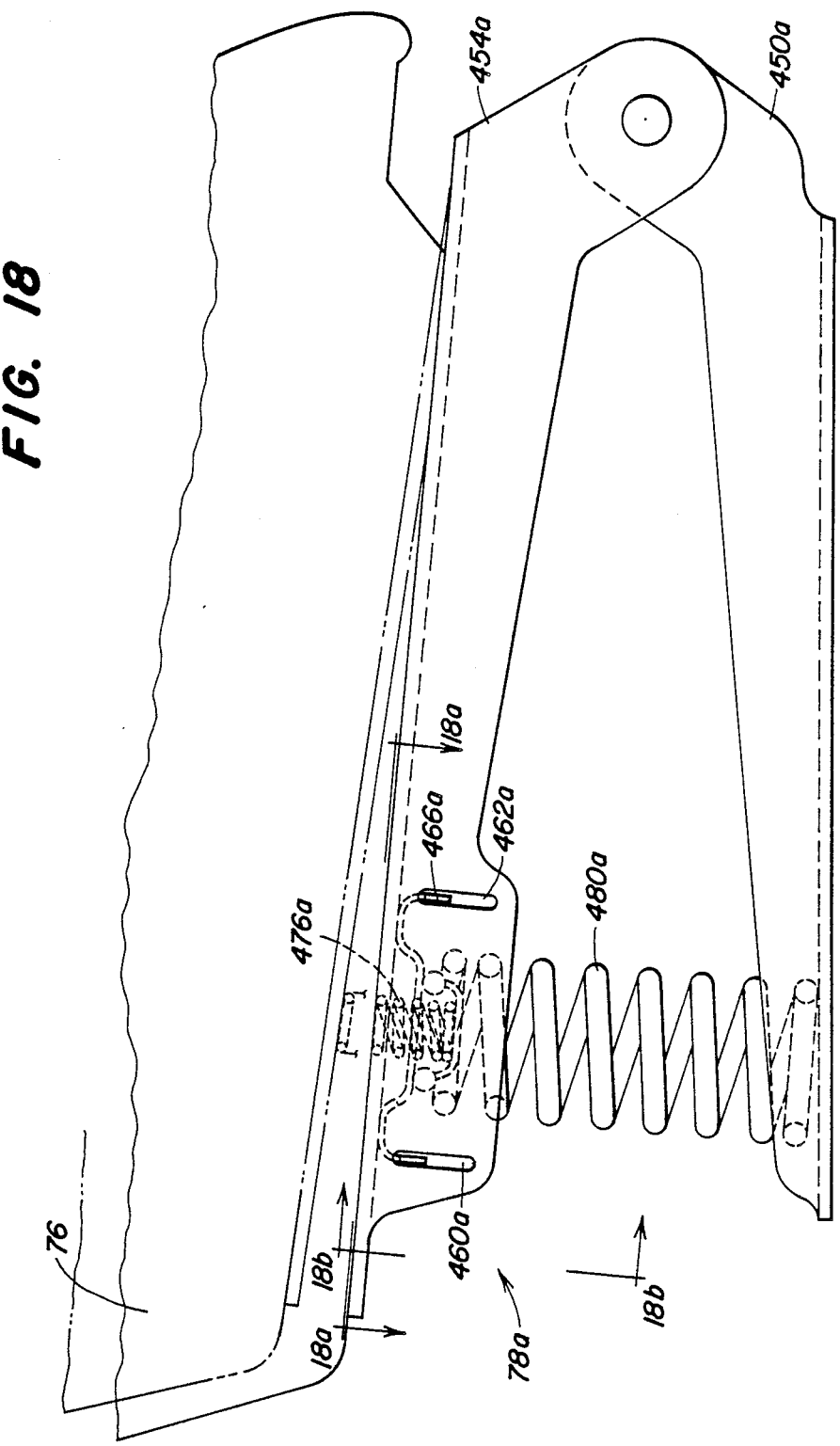
FIG. 18 is a partial right side elevational view of an operator seat structure embodying an alternate mounting of an operator presence sensing switch made in accordance with the present invention.
Figure 18A:
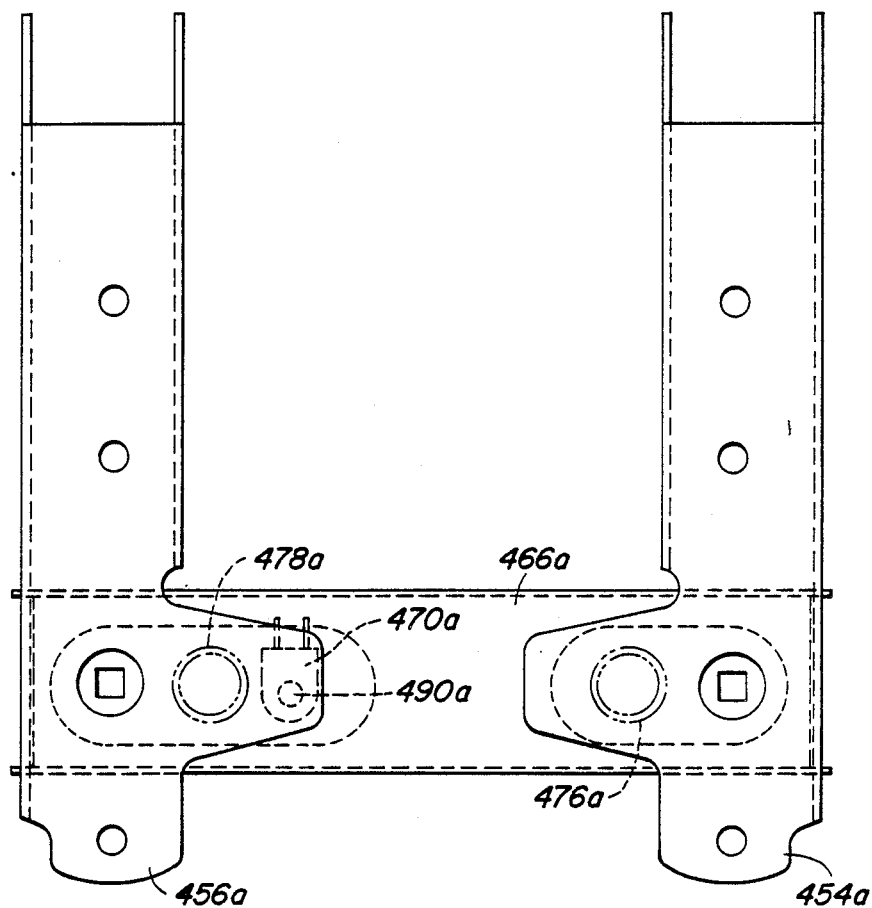
FIG. 18a is a view taken along line 18a—18a of FIG. 18.
Figure 18B:
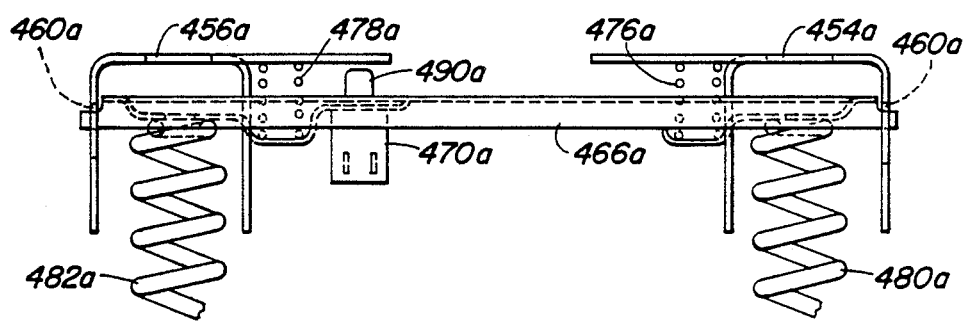
FIG. 18b is a view taken along line 18b—18b of FIG. 18.

A second embodiment of an operator presence sensing switch mounting is shown in FIGS. 18–18b, this embodiment being similar in principal to that just described. Specifically, there is shown an operator sensing switch mounting 78a wherein right- and left-hand channel-like upper seat support brackets 454a and 456a are fixed to the bottom of the seat 76 and have downwardly projecting lugs at the forward ends thereof respectively pivotally connected to respective forward upward projections of a right and left lower seat support brackets 450a (only the right bracket being shown) fixed to the top of the structure 68. The rear portion of each of the brackets 454a and 456a includes a horizontal inward projection located just behind a rear end of an inner flange of a respective bracket. Respective outer flanges of the brackets 454a and 456a are each provided with a set of rear and front vertically elongated apertures 460a and 462a and a channel-like cross beam 466a extends beneath the inward projections and has a set of tabs at its opposite ends respectively received for vertical movement within one of the sets of apertures 460a and 462a. Relatively soft springs 476a and 478a have their respective lower ends received in a respective well provided in the beam 466a and have their respective upper ends in engagement with the inward projections of the brackets 454a and 454b, the springs normally biasing the seat 76 away from the beam 466a such that the tabs of the beam are located in the bottoms of the sets of apertures 460a and 462a. Located outboard of the springs 476a and 478a, respectively are relatively stiff springs 480a and 482a having their lower ends engaged with respective horizontal flanges of the lower support brackets 450a and having their upper ends respectively engaged with the horizontal projections of the upper support brackets 454a and 456a. Mounted to the support beam 466a at a location beneath the inner end of the horizontal projection of the support bracket 456a is a switch 470a having a depressable plunger 490a projecting upwardly to a location adjacent the horizontal projection. The location of the switch 470a is offset to the left of the center of the beam 466a, the location of the mounting of the previously described switch 470. However, the spring rate of the springs 476a and 478a and their positions relative to the switch 470a are such that a load as small as 20 Kg will deflect the springs and even if such a load is applied to the right side of the seat 76, the deflection of the spring 476a will result in the seat moving toward the beam 466a such that the plunger 490a is depressed by the horizontal projection of the upper support bracket 456a.

What is claimed is:

1. In a tractor including a main frame supported on a plurality of wheels and being equipped with an adjustable lift system adapted for controlling the position of implements when said implements are connected to the tractor frame, said lift system comprising:
    lever means;
    rear rockshaft means rotatably mounted to said tractor frame;
    connection means interconnecting said lever means and said rear rockshaft means;
    mid rockshaft means including arm means adapted for connection to an implement and lost motion means for permitting a connected implement to float;
    second connection means interconnecting said rear rockshaft means and said mid rockshaft means for transmitting movement of said rear rockshaft means by said lever means to said mid rockshaft means;
    a main lift assist including an adjustable resilient means operatively connected to said rear rockshaft means for varying the lift effort required by said lever means;
    latch means connected to said lever means for holding said lever means in a fully raised position corresponding to a position of said mid rockshaft means for holding an implement in the fully raised position; and
    lock out means connected to said lever means for eliminating the force applied by said main lift assist.

2. The tractor of claim 1 wherein said lever means further comprises:
    a lever housing;
    a handle positioned on one end of said housing;
    a button positioned inside said handle;
    a rod positioned in said housing; and
    a third connection means interconnecting said button and said rod.

3. The tractor of claim 1 wherein said adjustable resilient means further comprises:
    a screw crank mounted to said tractor frame; and
    a spring connected to said screw crank and said rear rockshaft means.

4. The tractor of claim 1 further comprising:
    a forward rockshaft rotatably mounted to said tractor frame and being connected to said outer shaft member and including arm means adapted for at least partially mounting an implement to said tractor;
    an auxiliary lift assist including a further elongate resilient biasing means having one end coupled to an arm fixed to said forward rockshaft; and
    said further elongate resilient biasing means being so disposed relative to said forward rockshaft that when an implement is in a lowered position with the main lift assist locked out very little lifting force is applied to the forward rockshaft and such that during raising of an implement the lifting force of the auxiliary and main lift assists combine to result in a substantially constant lifting force.

5. The tractor of claim 1 wherein said mid rockshaft means includes:
    a tubular outer shaft member having said arm means attached thereto;
    an inner shaft member rotatably mounted to said tractor frame and having arm means attached thereto and having said outer shaft member rotatably received thereon;
    said lost motion means being between said inner and outer shaft members; and
    said connection means including a strap interconnecting said rear rockshaft and said inner shaft member.

6. The tractor of claim 5 wherein said strap is connected to at least one arm means of said inner shaft member, said arm means being operatively connected through said lost motion means to at least one of said arm means of said outer shaft member.

7. The tractor of claim 5 further comprising:
    depth step means being mounted to said tractor frame and operatively connected to said mid rockshaft means for limiting the movement of said mid rockshaft means in a direction corresponding that for lowering an implement operatively connected to said mid rockshaft means and thereby establishing a lower limit for such an implement.

8. The tractor of claim 7 wherein said depth stop means includes:
    adjustment means;
    a yoke connected to said adjustment means and to said arm means of said outer shaft member.

9. The tractor of claim 5 wherein said yoke is connected to said arm means of said outer shaft member by a lost motion slot formed in said latter mentioned arm means such that the distance between an implement carried by the tractor and the ground is positively limited while still allowing said implement to float upward between said ground and said tractor frame.

10. The tractor of claim 5 wherein said latch means includes:
    a latch strike member connected to said tractor frame; and
    a latch member operatively connected to said rear rockshaft means, said latch member having a first notch formed therein for maintaining an implement, carried by said tractor, in a raised position in response to the lever means being moved to a raised position.

11. The tractor of claim 10 wherein said lock out means includes:
   at least a second notch formed in said latch member such that when said implement has been moved to a working position, and force is applied to said lever means, said second notch interacts with said latch strike member such that said inner shaft member is connected in position and said outer shaft member is still free to rotate.

12. In a tractor including:
   a crankshaft oriented vertically,
   an engine for driving said crankshaft and having an air inlet,
   a liquid-cooled radiator positioned above and supported by said engine substantially perpendicular to said crankshaft in a space defined by an enclosure, and
   a cooling fan interposed between said engine and said radiator and connected to said crankshaft, the improvement comprising:
   first filter means releasably connected to said radiator and enclosing said engine air inlet for simultaneously filtering air entering said radiator and said engine air inlet.

13. The tractor of claim 12 wherein said radiator includes at least two snap clips releasably retaining said first filter means in sealed engagement with said radiator and said air inlet.

14. The tractor of claim 12 wherein said first filter means includes:
   an air impervious base having at least two apertures formed therein, one of said apertures having an area overlaying and substantially equal to an area of said radiator through which air passes and the other of said apertures snugly receiving said engine air inlet, said base member having receptacle means formed therein for releasably receiving said snap clips;
   four side members extending upwardly from and being joined to said base member and each other; and
   a top member being joined to said four side member, each of said four side members and said top member being formed by screen material for preventing debris from passing therethrough.

15. The tractor of claim 14 wherein said filter means further includes:
   a second filter means positioned on the upper surface of said radiator and having a perimeter engaged by a lower surface of said base member, said first filter means and said second filter means respectively having screen openings sized such as to prevent any debris from passing through both said first and said second filter means which is not capable of passing completely through said radiator without becoming lodged therein.

16. In a tractor frame including a pair of parallel side members joined together by a plurality of transverse members including front and rear members forming front and rear ends of the frame, the improvement comprising: said front and rear members being adapted for having suitcase weights hung thereon; and said rear member defining a hitch located at a level below the area which would be occupied by suitcase weights hung on said rear member whereby trailed implements may be hitched to the frame without interfering with weights carried by the rear member.

17. In a steering wheel tilt mechanism for a steerable vehicle including an upright steering column carrying a steering wheel at its upper end and being mounted for pivoting fore-and-aft about a horizontal pivot axis, a pair of transversely spaced column guide members having the column located therebetween, a member carried by said column for slidably engaging said guide members, a rack of teeth formed in each of said guide members on a radius about said pivot axis and a latch member slidably mounted on said column and being releasably biased into engagement with selected gaps between teeth so as to retain the column and thus said steering wheel in a selected attitude, the improvement comprising:
   said latch member also forming said member slidably engaging said guide members.

18. The steering wheel tilt mechanism defined in claim 63 wherein said latch member is in the form of a collar having an axially downwardly directed cam means defined on the bottom thereof;
   a sleeve rotatably mounted on but being fixed from shifting axially downwardly on the column below said collar and having an axially upwardly directed cam means shaped complimentary to and engaged with said downwardly directed cam means, with said cam means acting for effecting axial upward shifting of the latch member upon the sleeve being rotated from a normal position; and
   a lever being mounted on said column for pivoting thereabout and including means connecting the same to said sleeve for effecting rotation thereof whereby said lever may be selectively rotated for effecting disengagement of the latch member from said teeth for permitting the steering wheel to be repositioned by pivoting said column about said axis.

19. In a steering effort adjustment mechanism including a steering wheel coupled to a shaft connected to an input shaft projecting into a steering gear box and a pitman arm having one end connected to an output shaft emanating from said steering gear box and its other end coupled to a steering drag link, the improvement comprising:
   said pitman arm, with respect to the output shaft, having inner and outer points of connection for optional connection to said drag link, with the inner point being selected when it is desired that effort be minimized and with the outer point being selected when it is desired that responsiveness be maximized.

20. The steering effort adjustment mechanism defined in claim 19 wherein said inner and outer points of connection are spaced apart approximately 23.5 millimeters.

21. The steering effort adjustment mechanism of claim 19 wherein said outer point of connection is formed in said pitman arm such that said steering wheel has 2.25 turns lock-to-lock when the drag link is coupled to said outer point of connection.

22. The steering effort adjustment mechanism of claim 19 wherein said inner point of connection is formed in said pitman arm such that said steering wheel turns 3.0 turns lock-to-lock when the drag link is coupled to said inner point of connection.

23. In a tractor equipped with a reversible hydrostatic transmission coupled for driving a pair of drive wheels of the tractor, the transmission including a swash plate oscillatable in opposite first and second directions from a centered neutral position for respectively establishing increasing forward and reverse driving speeds of the tractor, and a control shaft coupled to the swash plate and oscillatable about a first axis so as to effect movement of said swash plate, an improved control for effecting oscillation of said control shaft comprising:

a control arm fixed to said control shaft and including a free end defined by an elongate cam surface formed arcuately about said axis and including a notch located between opposite ends of the cam surface;

a manual speed and direction control lever;

link means connecting said control lever to said control arm for effecting rocking movement of the latter for selectively effecting forward and reverse driving conditions in the transmission in response to movement of the control lever in opposite first and second directions from a neutral position; and a neutralizing assist for ensuring that the transmission will be placed in its neutral position when the control lever is placed in its neutral position, the assist including:

a roller support arm carrying a roller at one end and being pivotally mounted for swinging about a second axis extending parallel to the first axis and located in the vicinity of said cam surface with the roller being in contact with said cam surface;

biasing means acting on said roller support arm and urging said roller against said cam surface; and said roller and said notch being sized and shaped such that as said control arm approaches a centered position corresponding to the neutral position of the transmission the roller will enter the notch and move the control arm so as to effect neutralization of the transmission.

24. The tractor of claim 23 wherein said roller support arm is pivotally mounted by an eccentric structure permitting the effective length of the arm to be adjusted so as to adjust the roller relative to the cam surface for ensuring that the transmission is neutralized whenever the roller enters the notch.

25. The tractor of claim 23 wherein said notch and roller are shaped relative to each other so that the tractor transmission can operate the tractor at speeds as slow as ½ mph forwardly or in reverse without the roller entering the notch to neutralize the transmission.

26. The tractor of claim 23 and further including:

a brake pedal coupled to a brake control shaft pivotally mounted in the vicinity of and being parallel to said control shaft;

a cam plate fixed to said brake control shaft and containing an opening defining a cam surface;

said control arm having a projection extending in a direction opposite from the curved end of the arm;

a roller being mounted to said projection and disposed within said opening in the cam plate; and said roller and the cam surface defined by the opening in said cam plate being so disposed and shaped that upon the brake pedal being moved in a direction for effecting braking operation, the cam surface will engage the roller and effect rocking movement of the control arm to neutralize the transmission, assuming it is not already neutralized, and at the same time return the control lever to its corresponding neutral position.

27. The tractor of claim 23 wherein said link means includes a length adjustable link whereby the control lever may be precisely adjusted to its neutral position to correspond to the position of the control shaft for effecting neutralization of the transmission.

28. In a tractor equipped with a hydrostatic transmission including a housing forming a sump and having a pump located therein and coupled to an input shaft adapted for connection to an engine of the tractor, a motor located in the housing and coupled to an output shaft for imparting rotation to the latter and being coupled for receiving operating fluid from the pump, and a charge pump coupled being driven by said input shaft and being coupled for delivering working fluid to the pump, and a bypass valve located in the housing and being fluidly coupled to said motor for bypassing fluid flow generated by the motor when the latter is being driven through said output shaft as when the tractor is being moved with the engine stopped, the improvement comprising:

said bypass valve being in the form of a spool valve having a spool surface connected for receiving fluid delivered by said charge pump and being biased in a first direction by the pressure of such fluid to a normal position wherein it blocks a fluid path extending between an output of said motor and the sump, said bypass valve being manually shiftable in a second direction opposite to said first direction to a bypass position wherein it opens a fluid path extending between the output of the motor and the sump, whereby an operator may place the bypass valve in its bypass position so as to permit the tractor to be pushed when the engine is stopped, the valve thereafter automatically assuming its normal position once the engine is started and the charge pump is driven to deliver fluid to said surface of the bypass valve.

29. In a tractor including an operator's platform, a seat mounting bracket fixed to the platform, a seat coupled to the bracket by a suspension permitting the seat to move vertically relative to the bracket between an upward location which it occupies in the absence of an operator being seated thereon and a lower location which it occupies when an operator is seated thereon, and a normally open operator presence sensing switch being mounted for being closed only when an operator is present in the seat, an improved seat suspension and switch mounting arrangement comprising:

a lower seat mounting bracket means defining a pair of parallel spaced apart legs fixed to and extending upwardly from said platform;

an upper seat mounting bracket means vertically pivotally mounted to said spaced apart legs and including a pair of parallel, spaced apart depending legs which are each provided with at least one vertically elongated slot;

a beam extending between said depending legs and having at least one vertical tab at each end thereof received in a corresponding slot of an adjacent one of the depending legs, the tabs each having a height less than that of the slot;

a first pair of coil compression springs respectively positioned adjacent the opposite ends of and being beneath the beam and having respective lower ends engaged with one of the platform or lower seat mounting bracket means;

a second pair of coil compression springs positioned between the upper seat mounting bracket means and the beam and respectively being adjacent opposite ends of the beam, the second pair of coil compression springs having a spring rate which is relatively low in comparison to that of the first pair of coil compression springs; and said normally open switch being mounted to the beam and having a depressible plunger positioned between one of said seat and upper seat mounting bracket means so as to be depressed to effect closing of the switch upon sufficient force being applied to the seat to effect deflection of said second pair of coil compression springs.

30. The tractor of claim 29 wherein said second pair of coil compression springs are respectively located in axial alignment with said first pair of coil compression springs.

31. The tractor of claim 29 wherein said switch is located centrally between opposite ends of said beam.

32. The tractor of claim 29 wherein said beam is in the form of a downwardly opening channel with each end thereof being provided with a set of front and rear tabs respectively received in a set of front and rear slots provided in an adjacent leg of the upper seat mounting bracket means.

33. The tractor of claim 29 wherein said upper seat mounting bracket means includes a pair of inwardly extending projections respectively located above opposite end portions of said beam;

said second pair of coil compression springs respectively having their upper ends engaged with the pair of projections; and said switch being located such that its plunger is beneath one of the projections.

34. The tractor of claim 29 wherein the beam, springs and switch are so located relative to each other and the spring rate of the second pair of compression springs is such that the switch plunger will remain depressed with as little as about 20 kg being imposed on the seat and with the tractor operating on a slope as steep as about 15%.

* * * * *

UNITED STATES PATENT AND TRADEMARK OFFICE
CERTIFICATE OF CORRECTION

PATENT NO. : 4,969,533
DATED : 13 November 1990
INVENTOR(S) : David R. Holm et al.

It is certified that error appears in the above-identified patent and that said Letters Patent is hereby corrected as shown below:

In Col. 18, line 40, delete "step" and insert -- stop --.

In Col. 18, line 43, after "corresponding", insert -- to --.

In Col. 18, line 52, delete "5" and insert -- 8 --.

In Col. 19, line 33, delete "overlaying" and insert -- overlying --.

In Col. 20, line 18, delete "63" and insert -- 17 --.

Signed and Sealed this

Twenty-third Day of June, 1992

Attest:

DOUGLAS B. COMER

Attesting Officer

Acting Commissioner of Patents and Trademarks